United States Patent
Sato et al.

(10) Patent No.: US 7,242,861 B2
(45) Date of Patent: Jul. 10, 2007

(54) OPTICAL PATH CROSS-CONNECT AND OPTICAL WAVELENGTH MULTIPLEXING DIVERSITY COMMUNICATION SYSTEM USING THE SAME

(75) Inventors: Kazuyuki Sato, Miyagi (JP); Hiroki Konno, Miyagi (JP); Masami Dokai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 09/907,657

(22) Filed: Jul. 19, 2001

(65) Prior Publication Data

US 2002/0126350 A1    Sep. 12, 2002

(30) Foreign Application Priority Data

Mar. 6, 2001   (JP) .............................. 2001-062334

(51) Int. Cl.
*G02F 1/00* (2006.01)
*H04B 10/08* (2006.01)
*H04J 14/00* (2006.01)

(52) U.S. Cl. ................... 398/19; 398/3; 398/4; 398/12; 398/50; 398/56

(58) Field of Classification Search ................ 398/1–5, 398/10–13, 19, 20, 59, 80, 17, 45, 49, 50, 398/56, 57, 12, 51, 54, 55
See application file for complete search history.

(56) References Cited

U.S. PATENT DOCUMENTS 5,218,604 A * 6/1993 Sosnosky ..................... 370/223
5,327,427 A   7/1994 Sandesara ................ 370/85.14
5,440,540 A * 8/1995 Kremer ....................... 370/223
5,491,686 A * 2/1996 Sato ........................... 370/223

(Continued)

FOREIGN PATENT DOCUMENTS

EP    0920153    6/1999

(Continued)

OTHER PUBLICATIONS

Terumi Chikama, et al. "Photonic Networking Using Optical Add Drop Multiplexers and Optical Cross-Connects" FUJITSU Sci. Tech. J., 35, 1, pp. 46-55, Jul. 1999.

(Continued)

*Primary Examiner*—M. R. Sedighian
(74) *Attorney, Agent, or Firm*—Staas & Halsey LLP

(57) ABSTRACT

A protection system protects paths of internetwork communication between WDM ring networks, and includes a plurality of optical wavelength multiplexing networks having a plurality of nodes and a network management system for monitoring conditions of the plurality of nodes. The nodes include a first node having add/drop functions of adding/dropping wavelength-multiplexed optical signals; a second node having a signal transfer function as well as the add/drop functions; and a third node having an internetwork connection function between the networks. Each first, second and third nodes further includes optical path cross-connect switches and a table for indicating conditions of the optical path cross-connect switches and a detected node fault condition. The network management system controls to set the optical path cross-connect switches in the first, second and third nodes so that the optimal optical path connection may be obtained according to the detected node fault condition indicated in the node tables.

10 Claims, 29 Drawing Sheets

U.S. PATENT DOCUMENTS

| | | | |
|---|---|---|---|
| 5,550,818 | A | 8/1996 | Brackett et al. ............... 370/60 |
| 5,870,212 | A * | 2/1999 | Nathan et al. ................. 398/4 |
| 6,205,562 | B1 * | 3/2001 | Fukushima et al. ........... 714/43 |
| 6,278,689 | B1 * | 8/2001 | Afferton et al. ............ 370/223 |
| 6,295,146 | B1 * | 9/2001 | Nathan et al. ................ 398/50 |
| 6,414,767 | B1 * | 7/2002 | Blair et al. .................... 398/59 |
| 6,598,092 | B2 * | 7/2003 | Tomizawa et al. .......... 709/251 |
| 6,718,139 | B1 * | 4/2004 | Finan et al. .................. 398/59 |
| 6,731,597 | B1 * | 5/2004 | Batchellor et al. .......... 370/223 |
| 6,782,198 | B1 * | 8/2004 | Liu ................................ 398/3 |
| 6,810,215 | B1 | 10/2004 | Oikawa ...................... 398/175 |
| 2002/0003639 | A1 * | 1/2002 | Arecco et al. .............. 359/119 |
| 2002/0064166 | A1 * | 5/2002 | Suetsugu et al. ........... 370/403 |
| 2002/0176131 | A1 * | 11/2002 | Walters et al. .............. 359/118 |

FOREIGN PATENT DOCUMENTS

| | | | |
|---|---|---|---|
| JP | 10-243007 | | 9/1997 |
| JP | 10-243007 | | 9/1998 |
| JP | 10-243007 | * | 11/1998 |
| JP | 11-331227 | | 11/1999 |
| JP | 2001-36479 | | 2/2001 |
| WO | WO 98/25365 | | 6/1998 |
| WO | WO 99/03231 | | 1/1999 |
| WO | WO 99/37042 | | 7/1999 |
| WO | WO 00/76092 | | 12/2000 |

OTHER PUBLICATIONS

Roldan, et al., "Application of Dual-Access Architecture, with Drop and Continue Feature, to WDM Optical Networks", Technology and Infrastructure, Jun. 23, 1998, pp. 259-266.

McGuire, "Management of Optical Transport Networks", Electronics and Communication Engineering Journal, Institution of Electrical Engineers, vol. 11, No. 3, Jun. 1999, pp. 155-163.

Copy of European Patent Office Communication dated May 4, 2005 and copy of European Search Report.

Japanese Patent Office Action (Notification of Reason for Rejection) dated Dec. 2, 2005, in corresponding Japanese Application No. 2001-062334.

* cited by examiner

FIG. 10

| Network management information | Distance I | | NMS stores |
|---|---|---|---|
| | Line speed II | WDM,Client-by-client | |
| | Topology III | | |
| | User information IV | High-priority line, Best-effort, Priority, etc. | |

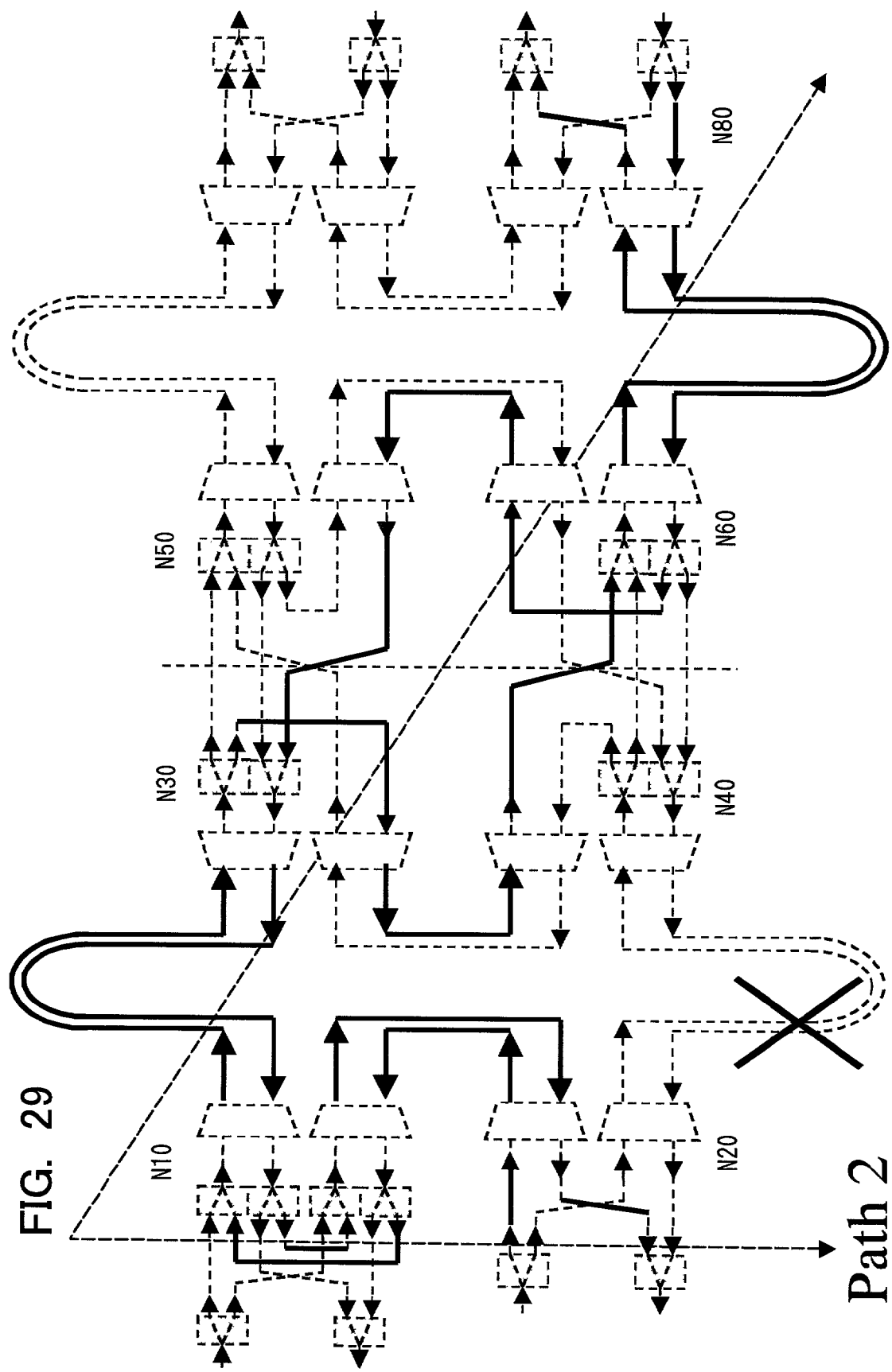

OPTICAL PATH CROSS-CONNECT AND OPTICAL WAVELENGTH MULTIPLEXING DIVERSITY COMMUNICATION SYSTEM USING THE SAME

FIELD OF THE INVENTION

The present invention relates to an optical path cross-connect and a wavelength division multiplexing (WDM) system using the same, and more particularly an optical wavelength multiplexing diversity communication system enabling path protection in the communication between ring networks.

BACKGROUND OF THE INVENTION

In a conventional WDM network, a path protection means against transmission line fault, etc. is usually provided. In FIG. 1, an example of network path protection in a conventional WDM system is shown. A terminal station 2 accommodating a first client (client 1) and another terminal station 3 accommodating a second client (client 2) are interconnected through duplicated optical transmission line fibers 1.

In terminal stations 2 and 3 in the system shown in FIG. 1-A, optical path cross-connect switches 6 are provided at the location nearer to the client, being connected to wavelength multiplexing/demultiplexing equipment 4 through transponders (transmitters and receivers) 5.

On the other hand, in terminal stations 2 and 3 in the system shown in FIG. 1-B, dispositions of transponders 5 and optical path cross-connect switches 6 are allocated oppositely to those applied in the system shown in FIG. 1-A, in which optical path cross-connect switches 6 are directly connected to wavelength multiplexing/demultiplexing equipment 4.

In FIG. 2, there is shown an enlarged chart of terminal station 2 shown in FIG. 1-A. (Terminal station 3 also has the identical configuration.) Terminal station 2 is connected to duplicated optical transmission line fibers 1-1 and 1-2 through duplicated multiplexing/demultiplexing equipment 4-1 and 4-2, respectively.

In FIG. 2, terminal station 2 includes a pair of transponders 5-1 and 5-2 and a pair of optical path cross-connect switches 6-1 and 6-2, respectively corresponding to the duplicated wavelength multiplexing/demultiplexing equipment 4-1 and 4-2.

Each transponder 5-1, 5-2 is provided with monitoring circuits 50 for monitoring signals transmitted through up/down links of wavelength multiplexing/demultiplexing equipment 4-1 and 4-2.

Optical path cross-connect switch 6-1 is connected to transmission line fibers of the duplicated transmission lines 1-1 and 1-2 directed to the first client. Optical path cross-connect switch 6-1 has a monitoring circuit 60 for monitoring respective signals transmitted through transmission lines 1-1 and 1-2. Similarly, optical path cross-connect switch 6-2 is connected to transmission line fibers of the duplicated optical transmission lines 1-1 and 1-2 directed to the second client.

In addition, in optical path cross-connect switch 6-2, there is also provided a monitoring circuit for monitoring signals transmitted through the transmission line fibers directed to the second client. This monitoring circuit is similar to monitoring circuit 60 provided in optical path cross-connect switch 6-1, and is not shown in FIG. 2.

In terminal station 2, outputs of monitoring circuits 50 of transponders 5-1 and 5-2 are input to a control circuit 21. Also outputs of monitoring circuits 60 of optical path cross-connect switches 6-1 and 6-2 are input to a control circuit 21.

In this control circuit 21, monitoring outputs from monitoring circuits 50 and monitoring circuits 60 are compared with control values input from a processor 7. Based on the result of the above comparison, control circuit 21 controls a selector 22 to switch over optical path cross-connect switches 6-1 and 6-2, in case of a fault, from a transmission line fiber having a fault to a standby transmission line fiber. Thus a means against fault is realized.

In FIG. 3, there is shown an enlarged drawing of terminal station 2 shown in FIG. 1-B, of which configuration is also applied to terminal station 3. Terminal station 2 is connected to the duplicated optical transmission line fibers 1-1 and 1-2 respectively through a duplicated sets of wavelength multiplexing/demultiplexing equipment 4-1 and 4-2.

In FIG. 3, terminal station 2 includes a pair of optical path cross-connect switches 6-1 and 6-2 each corresponding to the duplicated wavelength multiplexing/demultiplexing equipment 4-1 and 4-2.

Optical path cross-connect switch 6-1 is connected to the transmission line fibers of the duplicated optical transmission line fibers 1-1 and 1-2, being directed to the first client. Optical path cross-connect switch 6-1 has a monitoring circuit 60 for monitoring respective signals thereon. Similarly, optical path cross-connect switch 6-2 is connected to a transmission line fibers of the duplicated optical transmission line fibers 1-1 and 1-2 directed to the second client.

In addition, there is also provided a monitoring circuit for monitoring signals on the transmission line fiber directed to the second client. This monitoring circuit is similar to monitoring circuit 60 provided in optical path cross-connect switch 6-1, and is not shown in FIG. 3.

A line signal passed through the switched connection of optical path cross-connect switches 6-1 is input to a common transponder 5. In the opposite direction, a signal output from transponder 5 is input to optical path cross-connect switches 6-2. Transponder 5 includes monitoring circuits 50 for monitoring a signal transmitted on a transmission line fiber to the first clients, as well as a signal transmitted on a transmission line fiber in an opposite direction to the second clients.

In terminal station 2, outputs of monitoring circuits 50 of transponders 5 and monitoring circuits 60 of optical path cross-connect switches 6-1 and 6-2 are input to control circuit 21.

In this control circuit 21, monitored outputs from monitoring circuits 50 and monitoring circuit 60 are compared with control valued input from processor 7. Base on the result of the above comparison, control circuit 21 controls a selector 22 to switch over optical path cross-connect switches 6-1 and 6-2, from a transmission line fiber having a fault to a standby transmission line fiber.

In the system configurations shown in FIGS. 2 and 3, terminal stations 2 and 3 are so configured as to interconnect with the duplicated optical transmission line fibers 1-1 and 1-2. In such configurations, terminal stations 2 and 3 are interconnected with a one-to-one i.e. point-to-point connection.

In FIG. 4, there is shown another example of wavelength multiplexing transmission network, in which a plurality of nodes N1 to N4 are interconnected by transmitting signals successively from one node to the neighboring node. Namely, each connections between nodes N1 and N2, nodes N1 and N4, nodes N2 and N3, and nodes N3 and N4 is configured with a point-to-point connection, which is similar to the configuration shown in FIG. 1. Each node is provided with a function of terminating wavelength multiplexed signals having wavelengths λ1 to λn received from the other node.

In FIG. 4, node N1 and node N2 are interconnected via a repeater RP. Even in this case, each node N1/N2 is provided with the same terminating function as mentioned above.

It will be a problem in such a future WDM network that is constituted by a ring network or interconnection of such ring networks, because it is not possible to realize optical transmission line protection by the method shown in FIG. 1 for such networks having ring configuration.

Moreover, in such a system having duplicated optical transmission line fibers as shown in FIG. 1, two wavelengths (λ) must be allocated: one wavelength for a working transmission line and the other wavelength for standby transmission line. In other words one wave cannot be used at any time. This produces reduced transmission capacity against the transmission capacity logically induced.

SUMMARY OF THE INVENTION

Accordingly, it is an object of the present invention to provide a protection system for interconnecting WDM ring networks, enabling to construct WDM ring networks using currently available hardware.

An optical wavelength multiplexing diversity communication system in accordance with the present invention includes a plurality of optical wavelength multiplexing networks each having a plurality of nodes; and a network management system for monitoring conditions of each plurality of nodes. Each plurality of nodes includes; a first node having functions of adding/dropping optical wavelength-multiplexed signals to/from the network; a second node having a signal transfer function as well as the aforementioned signal add/drop functions; and a third node having an internetworking function for interconnecting networks. The first, second and third nodes respectively include optical path cross-connect switches, a table for representing status of the optical path cross-connect switches and node fault detection condition. The network management system controls to set the optical path cross-connect switches according to the corresponding node fault detection condition so as to obtain the optimal optical path connection condition.

As a preferred embodiment of the optical wavelength multiplexing diversity communication system according to the present invention, the aforementioned network management system retains in advance the shortest path information related to the interconnection of the aforementioned plurality of nodes; determines the optimal path based on the node fault detection condition of the first, second and third nodes represented by the table; and controls to set the optical path cross-connect switches in the corresponding node.

Further, as a preferred embodiment of the optical wavelength multiplexing diversity communication system according to the present invention, the aforementioned optical wavelength multiplexing network includes a first ring network, a second ring network, and, as the aforementioned third node, at least two pairs of nodes for interconnecting the first ring network and the second ring network.

As still further preferred embodiment of the optical wavelength multiplexing diversity communication system according to the present invention, optical transmission lines for interconnecting nodes in the first and the second ring networks are constituted by a pair of optical transmission lines to transmit optical signals in mutually opposite directions. The aforementioned at least two pairs of the nodes for interconnecting the first and second ring networks are connected with optical transmission lines on which optical signals are transmitted in mutually opposite directions.

According to the present invention, optical path cross-connect equipment for the optical wavelength multiplexing diversity communication system includes; a first to third optical branching devices for branching each optical path into two optical paths corresponding to a first to third optical paths; a first to third optical path cross-connect switches respectively connected to a fourth to sixth optical paths for selecting one input out of the two optical path inputs to output.

The first optical path cross-connect switch selects one of the first and second optical paths respectively branched by the first and second optical branching devices, to connect to the the fourth optical path. The second optical path cross-connect switch selects one of the second and third optical paths respectively branched by the second and third optical branching devices, to connect to the fifth optical path. Also, the third optical path cross-connect switch selects one of the first and third optical paths respectively branched by the first and third optical branching devices, to connect to the sixth optical path.

According to the present invention, in the optical path cross-connect equipment for the optical wavelength multiplexing diversity communication system, the second and sixth optical paths, and also the third and fourth optical paths, are respectively connected to the network through optical wavelength conversion equipment provided for converting each input optical wavelength into a desired wavelength.

Further scopes and features of the present invention will become more apparent by the following description of the embodiments with the accompanied drawings.

BRIEF DESCRIPTION OF THE DRAWINGS

FIG. 10 shows a database having network management information.

FIG. 29 shows a chart illustrating relieved communication in the case of a fault at the location X on both-way transmission lines of a path 2.

DETAILED DESCRIPTION OF THE PREFERRED EMBODIMENTS

The preferred embodiment of the present invention is described hereinafter referring to the charts and drawings, wherein like numerals or symbols refer to like parts.

Figure 1:
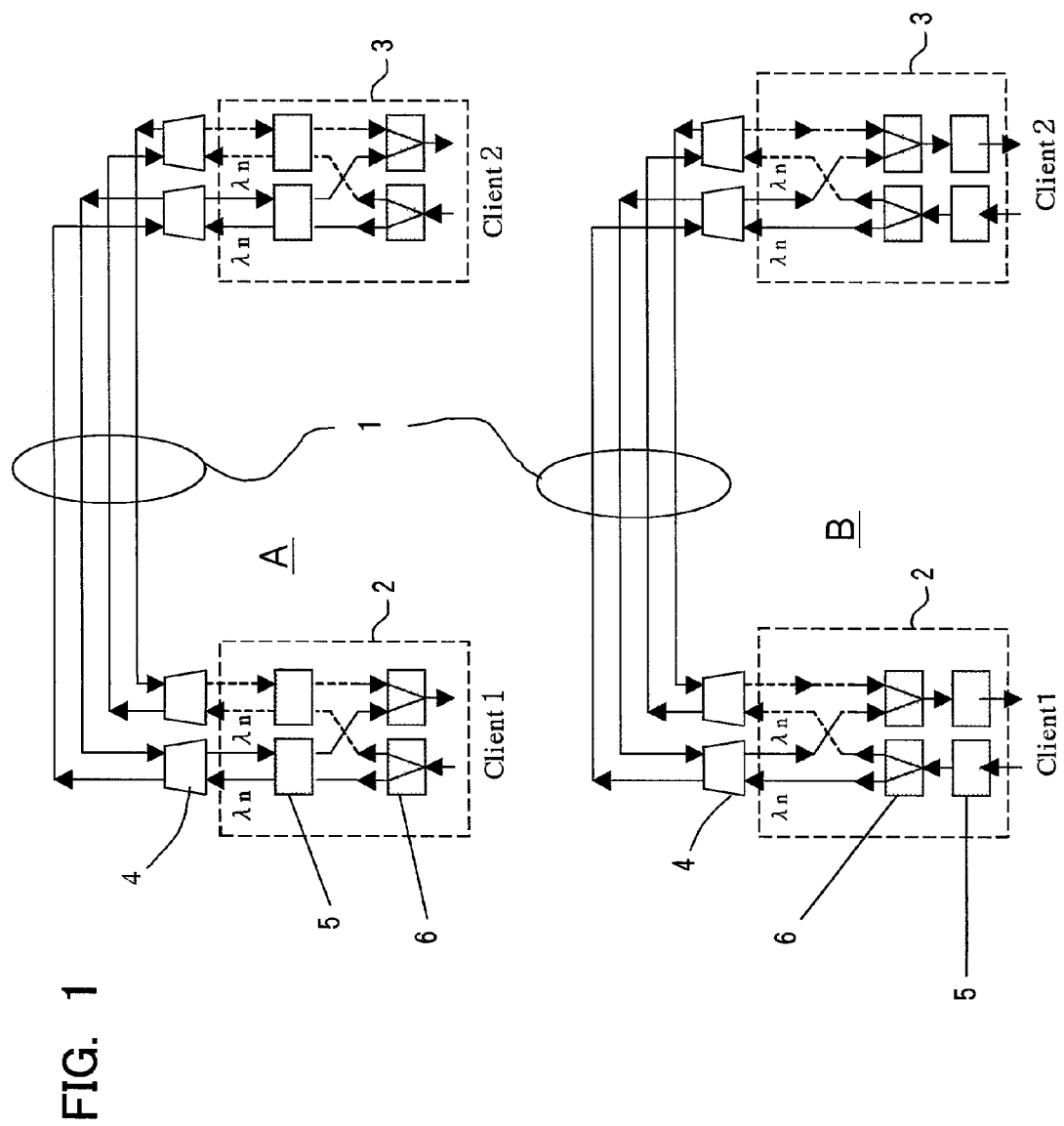
FIG. 1 shows a network protection method used in a conventional WDM system.
Figure 2:
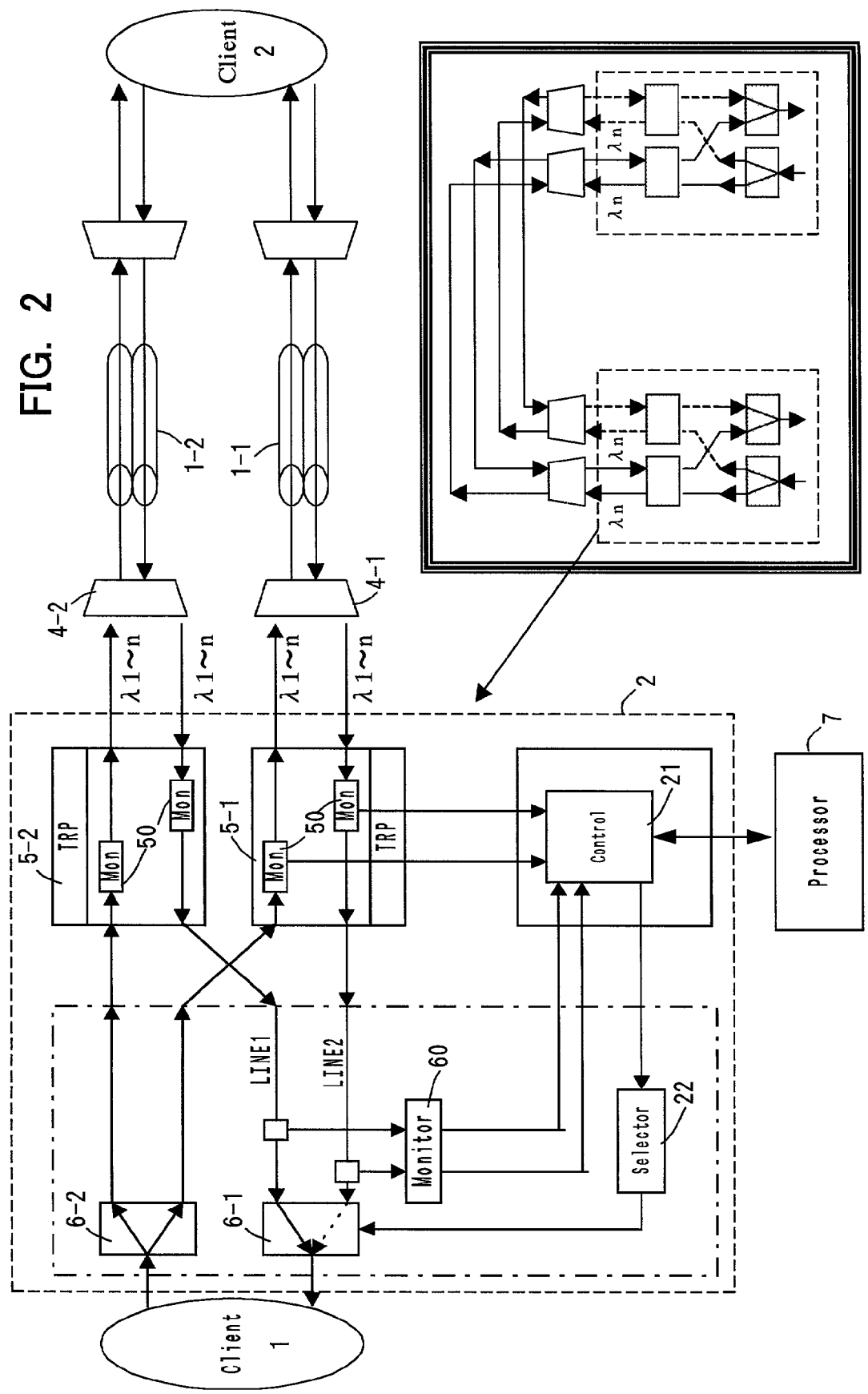
FIG. 2 shows an enlarged drawing of terminal station 2 shown in FIG. 1-A.
Figure 3:
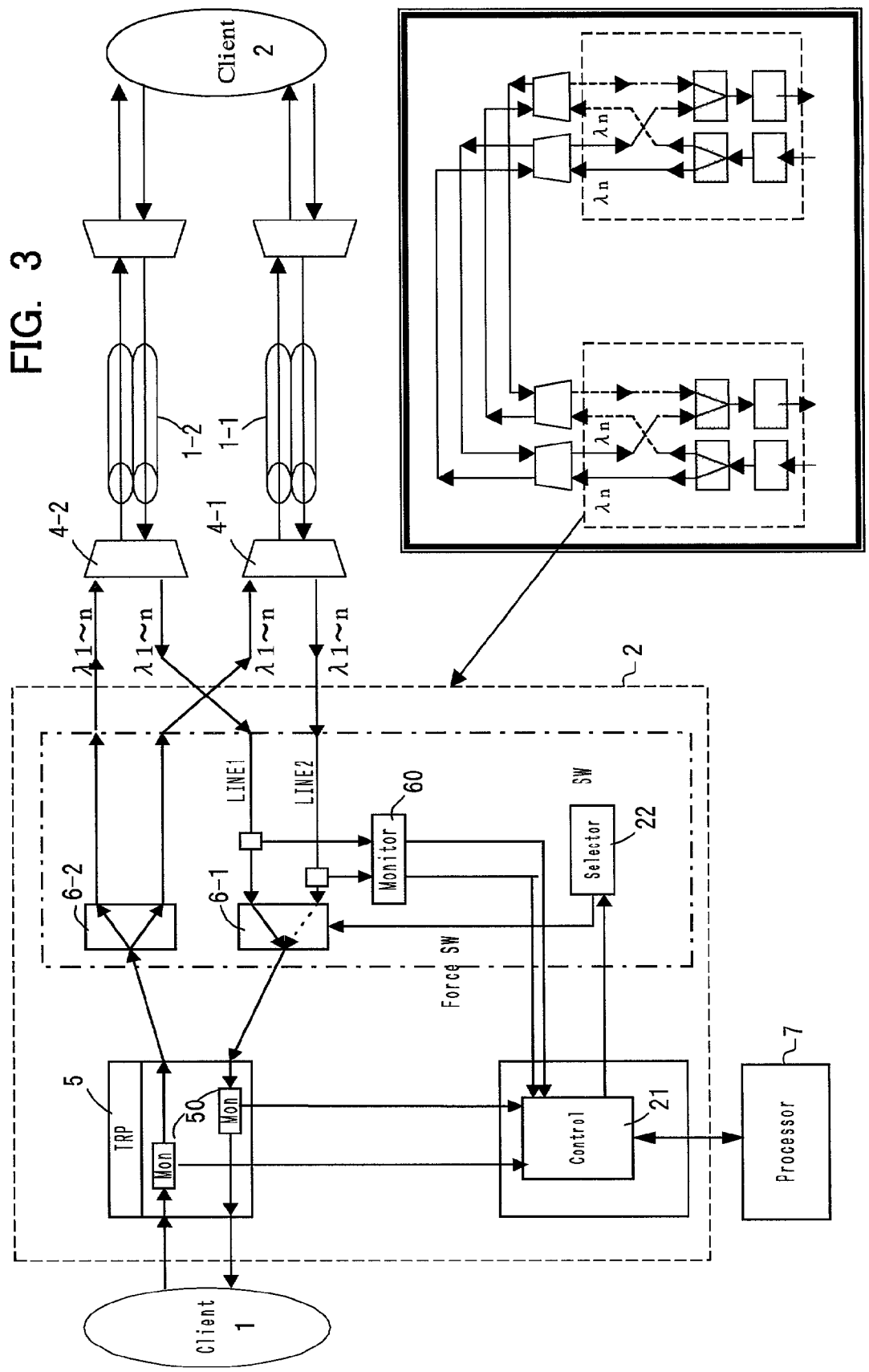
FIG. 3 shows an enlarged drawing of terminal station 2 shown in FIG. 1-B.
Figure 4:
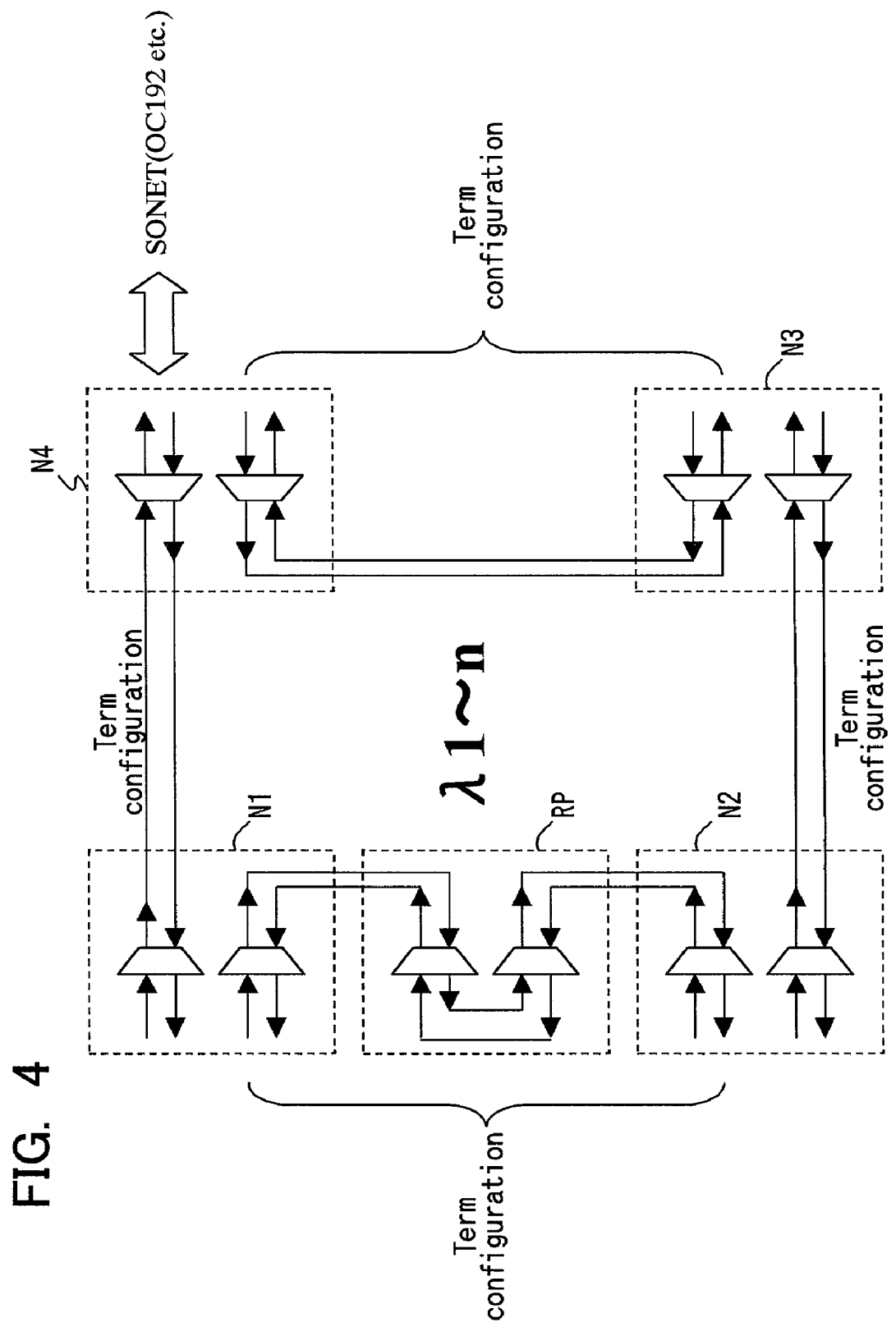
FIG. 4 shows a conceptual diagram of another example of a wavelength multiplexing transmission network.
Figure 5:
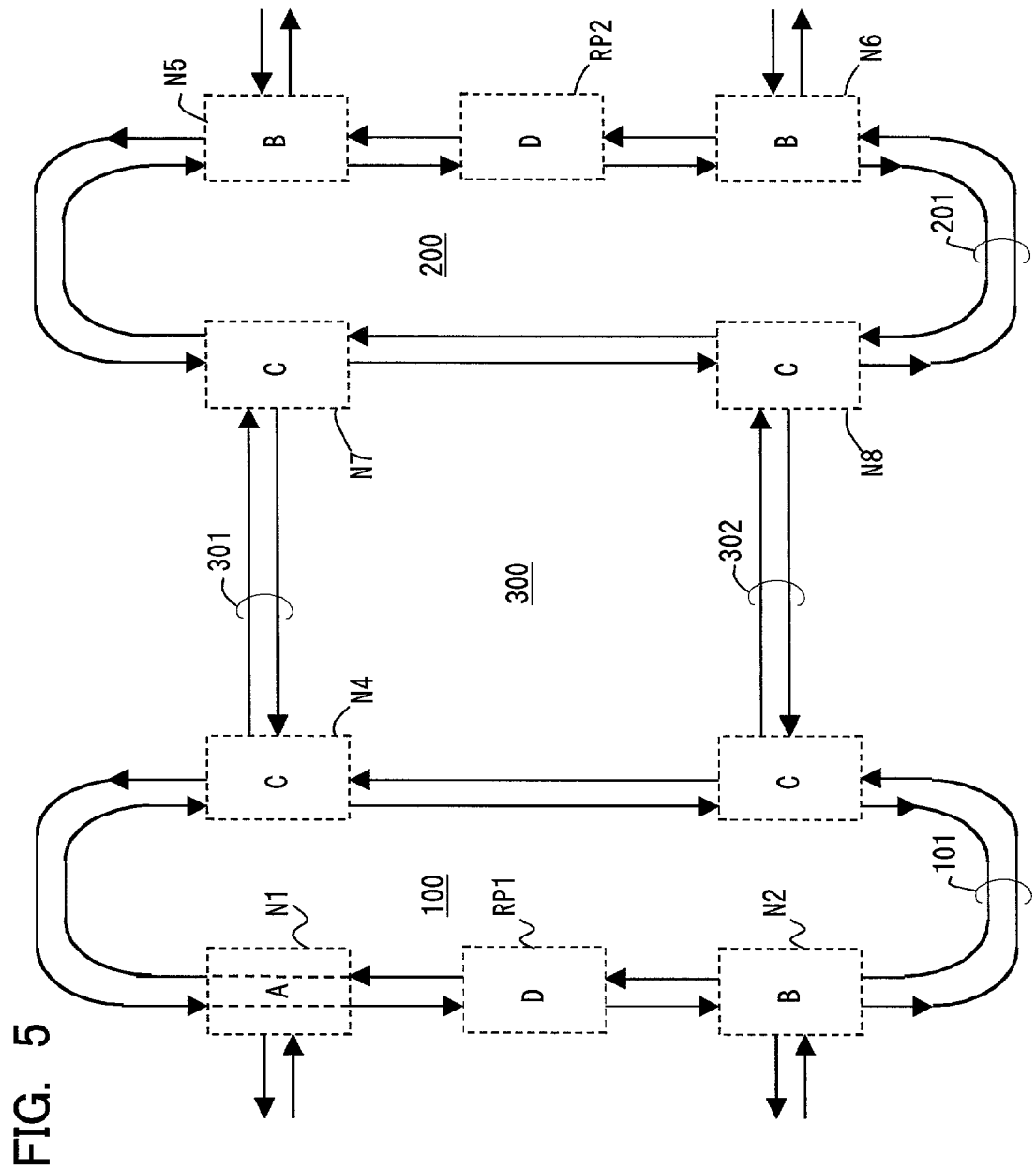
FIG. 5 shows a configuration diagram of ring networks interconnected by transmission lines in accordance with the present invention.

In FIG. 5, there is illustrated a network configuration according to the present invention having transmission lines for interconnecting ring networks.

A first ring network 100 includes; a first node N1 having functions of adding/dropping optical wavelength-multiplexed signals to/from the network and transferring signals; a second node N2 having functions of adding/dropping optical wavelength-multiplexed signals to/from the network; and third nodes consisting of two nodes N3 and N4 having an internetworking function for interconnecting networks. Further, the ring network also includes a node RP1 having a regenerative repeating function.

These plurality of nodes N1 to N4 and RP1 are mutually connected by two optical transmission line fibers 101 for transmitting optical wavelength-multiplexed signals in one direction and the other.

In FIG. 5, the functions of adding, dropping and transferring optical wavelength-multiplexed signals provided in the first node N1 (simply referred to as add, drop and continue) is represented by a reference symbol 'A'; the functions of adding and dropping optical wavelength-multiplexed signals provided in the second node N2 (add, drop) is represented by a reference symbol 'B'; the internetworking function (ring interconnection) provided in the second node N2 is represented by a reference symbol 'C'; and the regenerative repeating function provided in the node RP1 is represented by a reference symbol 'D'.

Moreover, in FIG. 5, a second ring network 200 includes; the second nodes N5 and N6 having functions of adding/dropping optical wavelength-multiplexed signals to/from the network (represented by the reference symbol 'B'); and the third nodes N7 and N8 each having an internetworking function for interconnecting networks (reference symbol 'C'). Further, network 200 also includes a node RP2 having a regenerative repeating function (reference symbol 'D').

These nodes N5 to N8 and RP2 are interconnected in ring form by two optical transmission line fibers 201 respectively transmitting optical wavelength-multiplexed signals in one direction and the other.

Also, in FIG. 5, two optical transmission line fibers 301 and 302, respectively transmitting optical wavelength-multiplexed signals in one direction and the other, interconnect the aforementioned first and second ring networks through each two pairs of the third nodes; N4, N7 and N3, N8.

In the network configuration according to the present invention, nodes N10, N20 and N30, each having the function previously defined as 'A', 'B' or 'C', includes optical path cross-connect equipment for switching optical paths.

Figure 6:
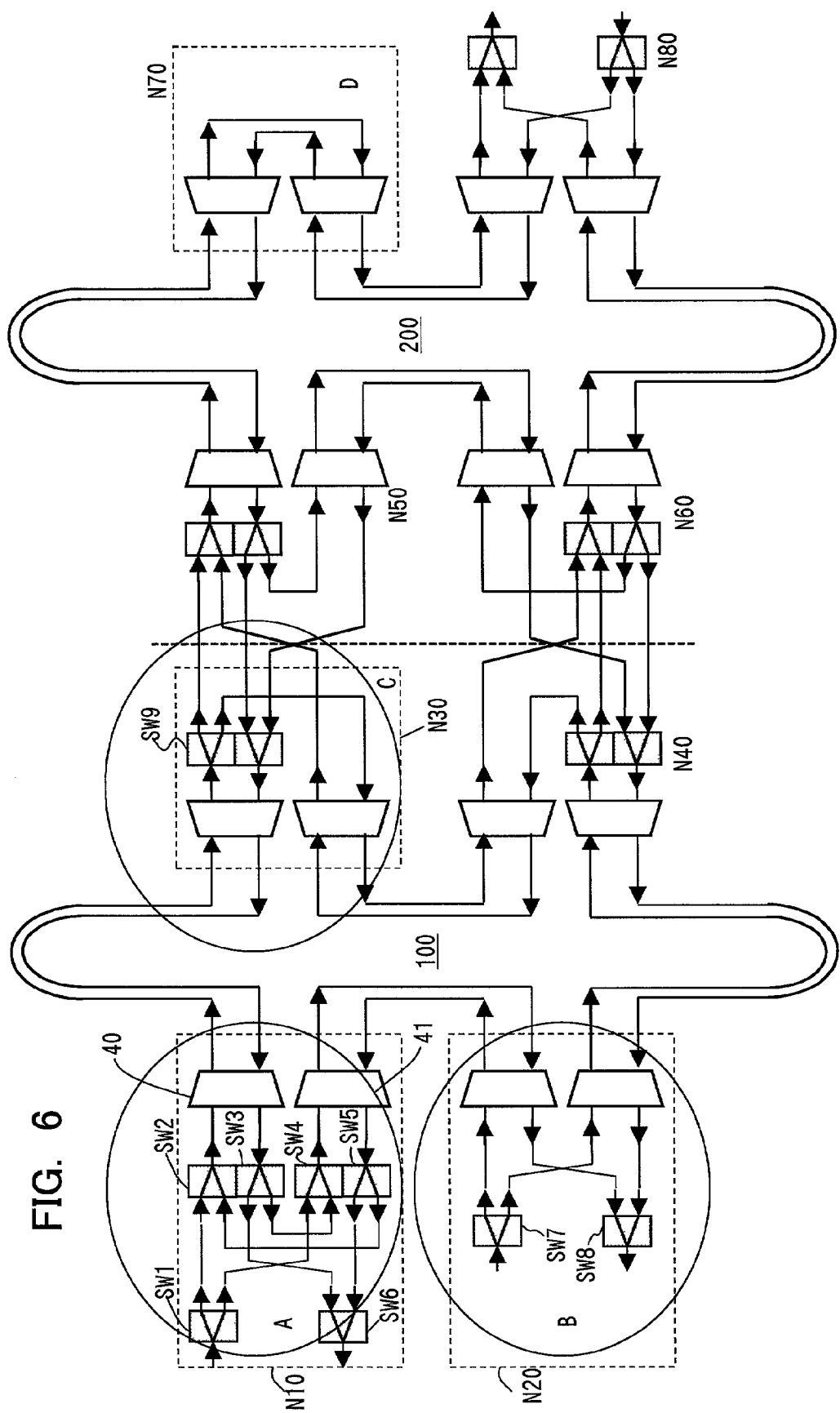
FIG. 6 shows respective nodes denoted as 'A', 'B' and 'C' provided with optical path cross-connect switches SW.

In FIG. 6, there is shown a configuration example of optical path cross-connect equipment provided in each node N10, N20 or N30 having functions of 'A', 'B' or 'C'. As shown in the figure, optical path cross-connect equipment is constituted by optical path cross-connect switches SW1 to SW6 (in N10), SW7 and SW8 (in N20), or SW9 (in node N30).

Optical path cross-connect switches SW2, SW4 and SW6 select one input optical path out of the two optical paths to output, while optical path cross-connect switches SW1, SW3, SW5, SW7 and SW9 branch one input optical path to output two optical paths. Namely, optical path cross-connect switches SW1, SW3, SW5, SW7 and SW9 may also be constituted by optical branching devices. (Accordingly, hereafter these switches may also be referred to as optical branching devices SW1, SW3, SW5, SW7 and SW9.)

In particular, when considering optical cross-connect switches in node N10, a first to third optical branching devices SW1, SW3 and SW5 respectively branch optical paths corresponding to a first to third optical path into two optical paths.

Each one of the optical paths respectively branched from the first and second optical paths by the first and second branching devices SW1, SW3 is selected by a first optical path cross-connect switch SW4 to connect to a fourth optical path.

Similarly, each one of the optical paths respectively branched from the second and third optical paths by the second and third branching devices SW3, SW5 is selected by a second optical path cross-connect switch SW6 to connect to a fifth optical path.

Also, each one of the optical paths respectively branched from the first and third optical paths by the first and third branching devices SW1, SW5 is selected by a third optical path cross-connect switch SW2 to connect to a sixth optical path.

The aforementioned second and sixth optical paths and the third and fourth optical paths are respectively connected to ring network 100 through optical wavelength conversion equipment 40, 41 provided for converting input optical wavelengths into desired optical wavelengths.

Figure 7:
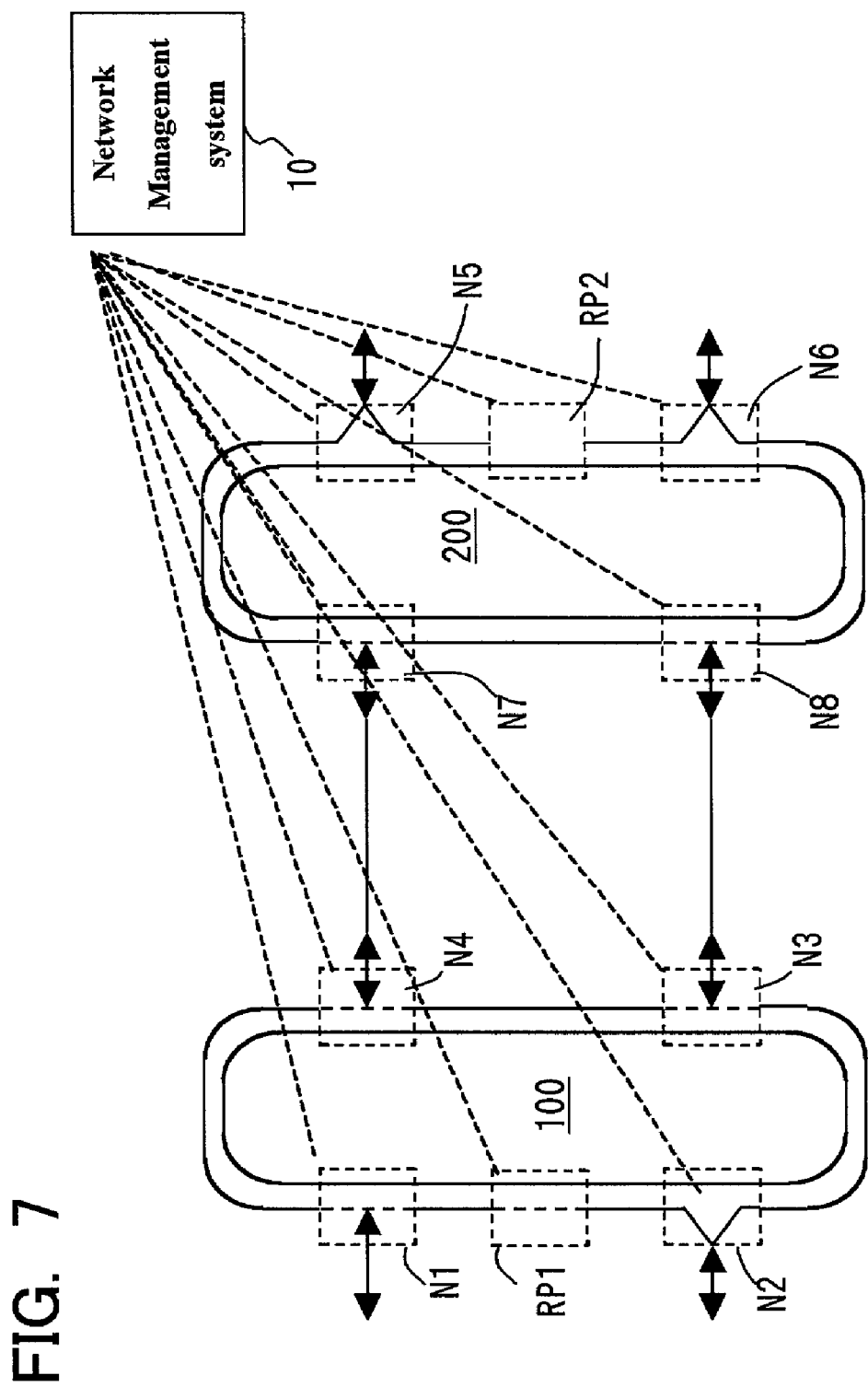
FIG. 7 shows a system configuration according to the present invention, including a common network management system 10 provided in the network configuration shown in FIG. 5.

In FIG. 7, further feature of the present invention is illustrated. There is shown a configuration which includes a common network management system 10 in addition to the network configuration shown in FIG. 5. The network management system is connected to each node having the aforementioned optical path cross-connect switches SW so as to manage each node status.

Figure 8:
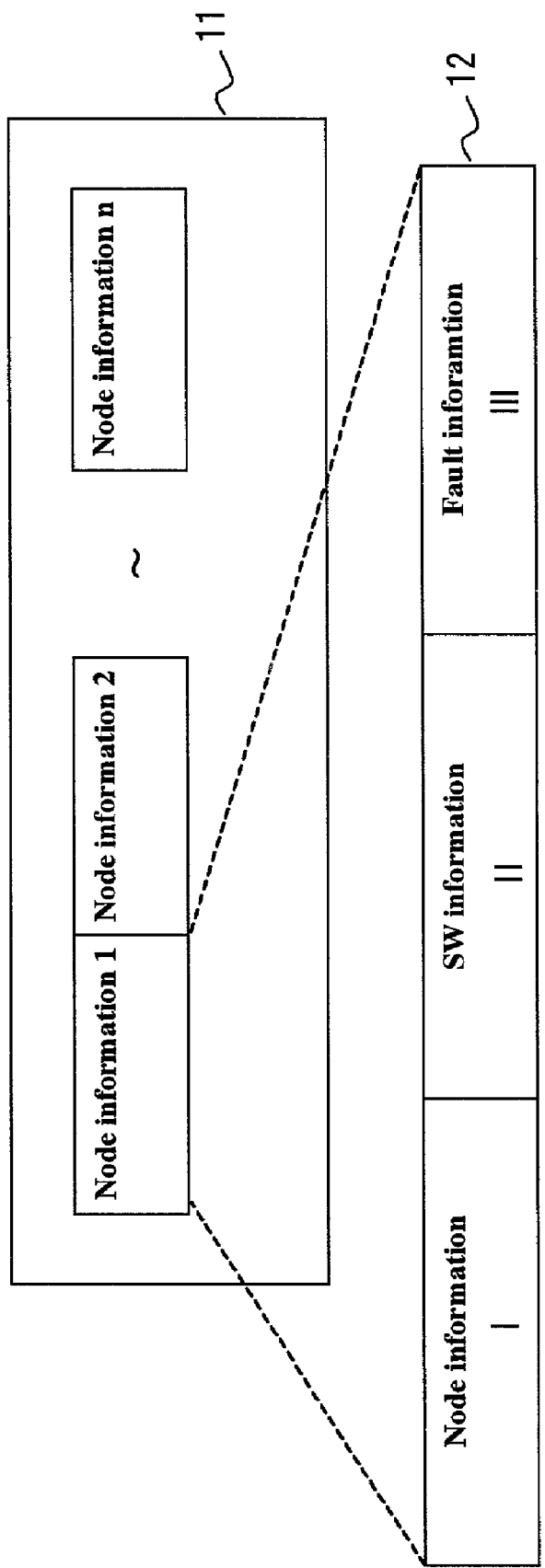
FIG. 8 shows each node status mapped in network management system 10.

As shown in FIG. 8, node status is mapped into a table 11 in network management system 10 on a node-by-node basis. Node status 12 includes node information I, switch information II and fault information III for each node.

Node information I indicates information for identifying the functions provided in each node having optical path cross-connect switches SW, namely the aforementioned add/drop/continue functions, add/drop functions, or ring interconnection function.

Figure 9:
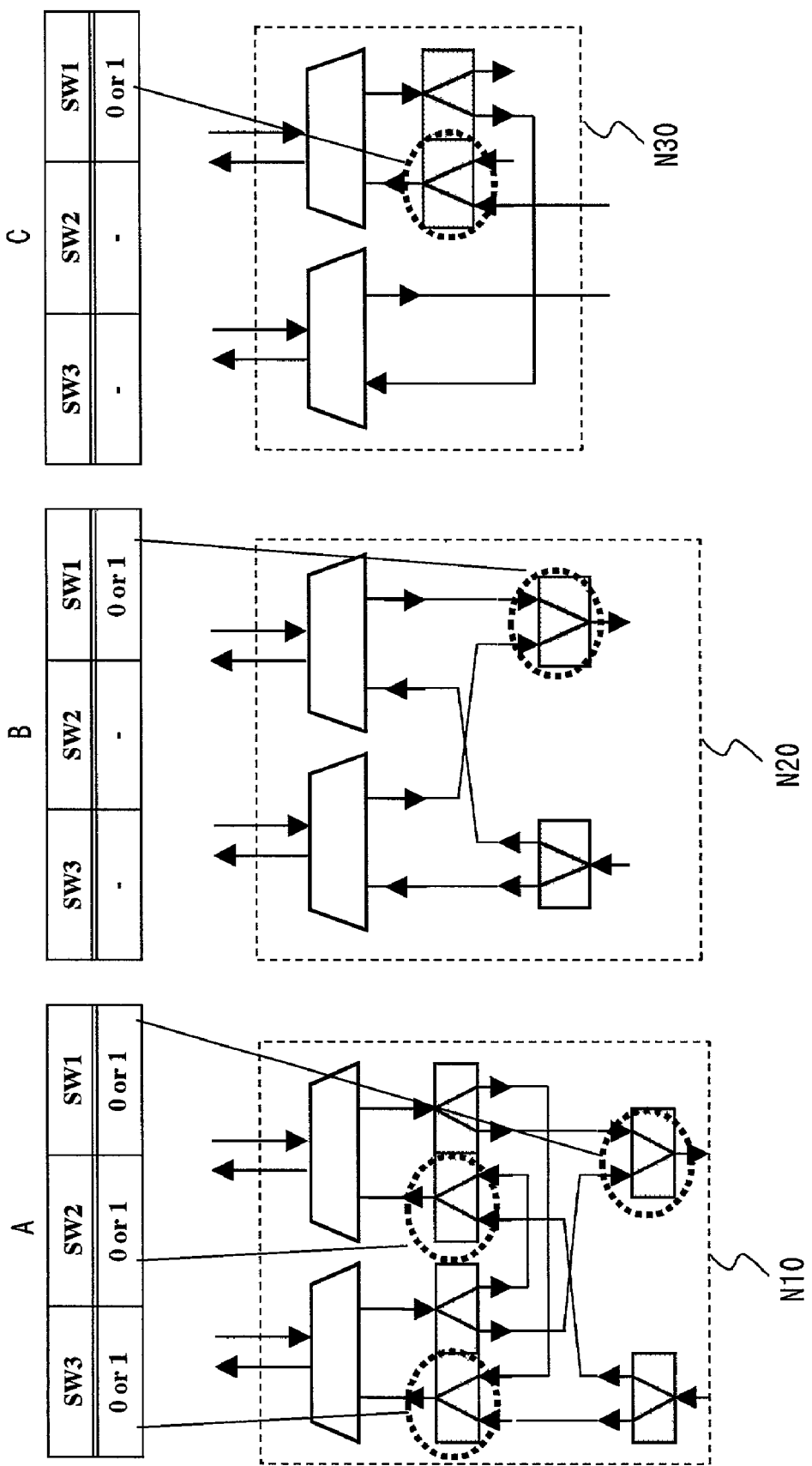
FIG. 9 shows an example of switch register information.

Switch information II indicates information of switch registers which include the status of optical path cross-connect switches SW shown in FIG. 6. In FIG. 9, an example of switch register information is shown. Tables in FIGS. 9-A, 9-B and 9-C represent status of optical path cross-connect switches SW in the respective nodes N10, N20 and N30 shown in FIG. 6. Here, a value '0' or '1' shows an effected connection of the switch concerned. In other words, the value indicates which side the switch of interest is currently connected. Furthermore, fault information III indicates fault detection condition in each corresponding node.

Network management system 10 stores in a database network management information shown in FIG. 10. Network management information includes the distance between clients I, line speed managed on a client-by-client basis II, network topology III, and user information IV such as indication of high-priority line, best-effort, etc.

Figure 11:
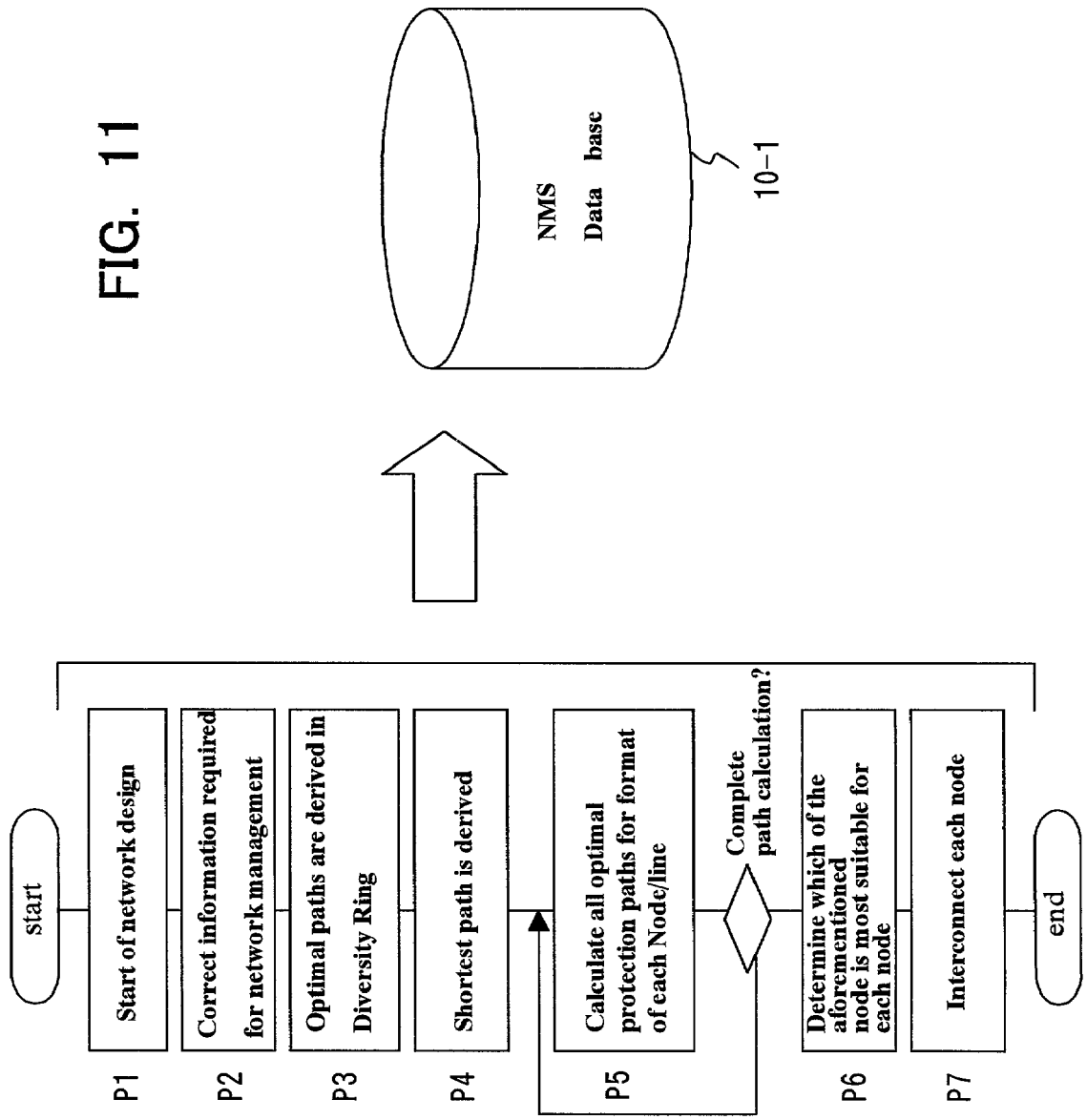
FIG. 11 shows a process flow of the collection and processing of network management information.

Collection and processing of such network management information is carried out along a procedure shown in FIG. 11. The information is determined at the time of network designing. At the start of network design (procedure P1), information required for network management is collected from each node, as shown in FIG. 10 (procedure P2).

Optimal paths between arbitrary two nodes are derived according to the collected information (procedure P3). Then the shortest path among each derived optimal path is derived (procedure P4). Next, the optimal protection path is calculated for each node and transmission line fiber (procedure P5).

On completion of the path calculation, the optimal type of nodes is determined. Namely, it is determined which of the aforementioned node functions A, B and C is most suitable for each node (procedure P6). The determined node type defines the function of the node concerned. The nodes are interconnected using the optimal path previously obtained (procedure P7).

The optimal protection path information thus obtained from the procedures is stored in a database 10-1 as apart of information for network management.

Figure 13:
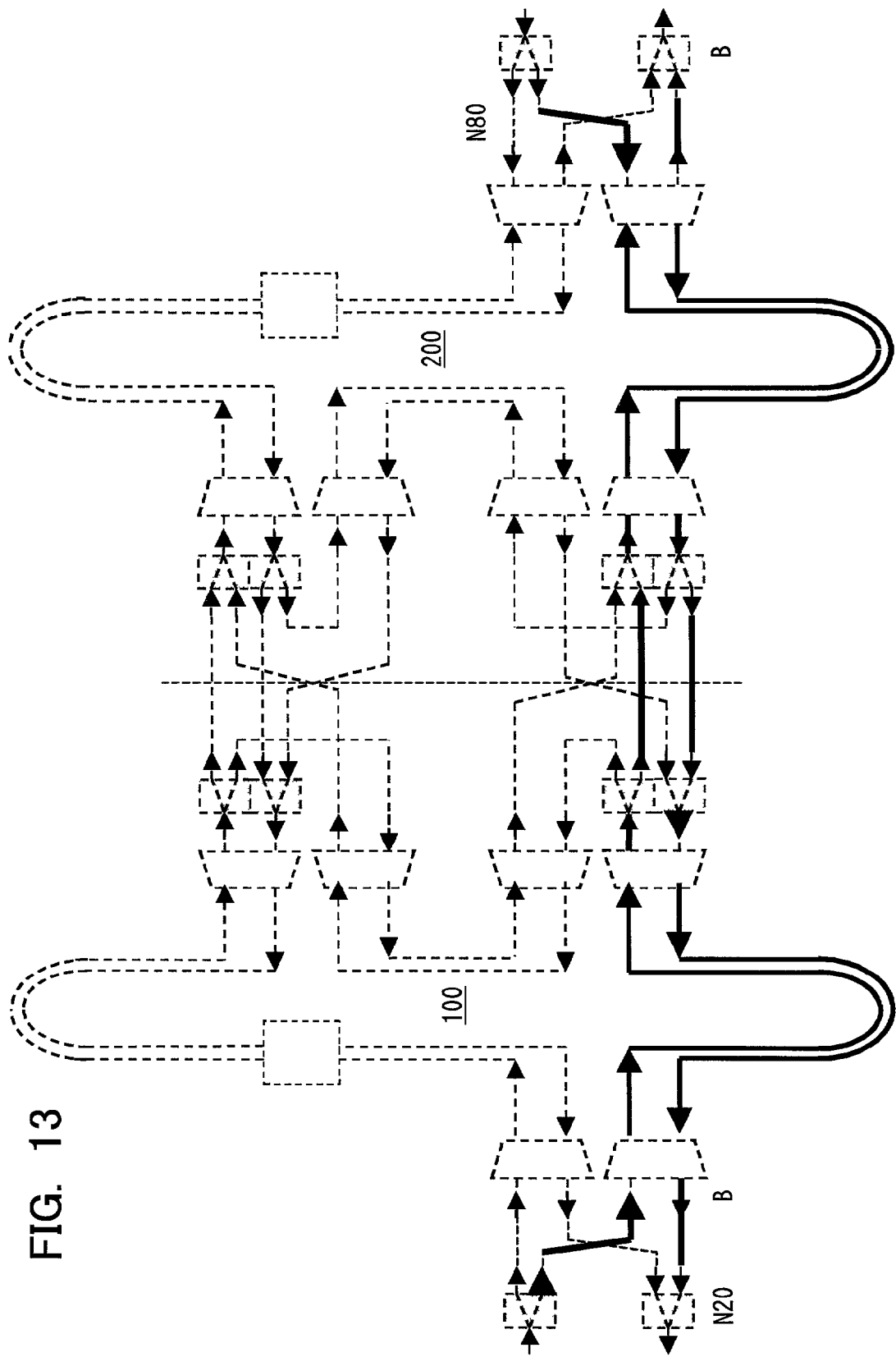
FIG. 13 shows a normal network topology when communication is carried out between nodes N20 and N30.

Now, examples of the optimal protection path information are shown in FIGS. 13 to FIG. 29. Here, the topology in the normal condition for communicating between nodes N20 and N80 is assumed as shown in FIG. 13.

Figure 14:
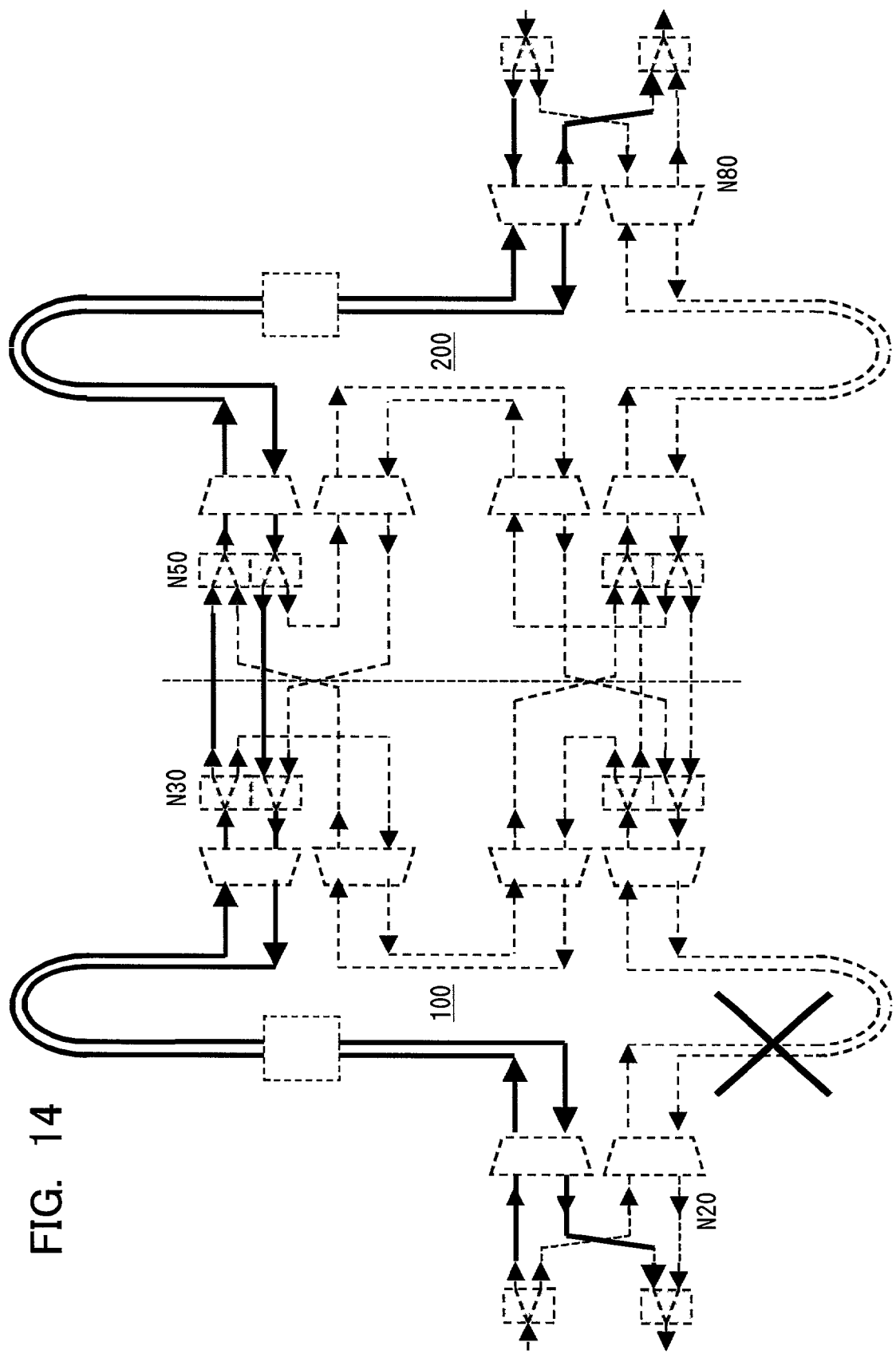
FIG. 14 shows a protection path in the case of a fault occurring on both-way transmission line fibers at the location indicated by a mark X.

In FIG. 14, there is shown a protection path in case that a fault occurs at the location marked with X of the both-way transmission line fibers. In nodes N20 and N80, each optical path cross-connect switch SW in a protection unit is switched over. Further, each optical path cross-connect switch SW provided in each protection unit of internetwork connection nodes N30 and N50 is set effective. Accordingly, communication between N20 and N80 is maintained through the diverted transmission line fibers, as shown with bold lines, in ring networks 100 and 200.

Figure 15:
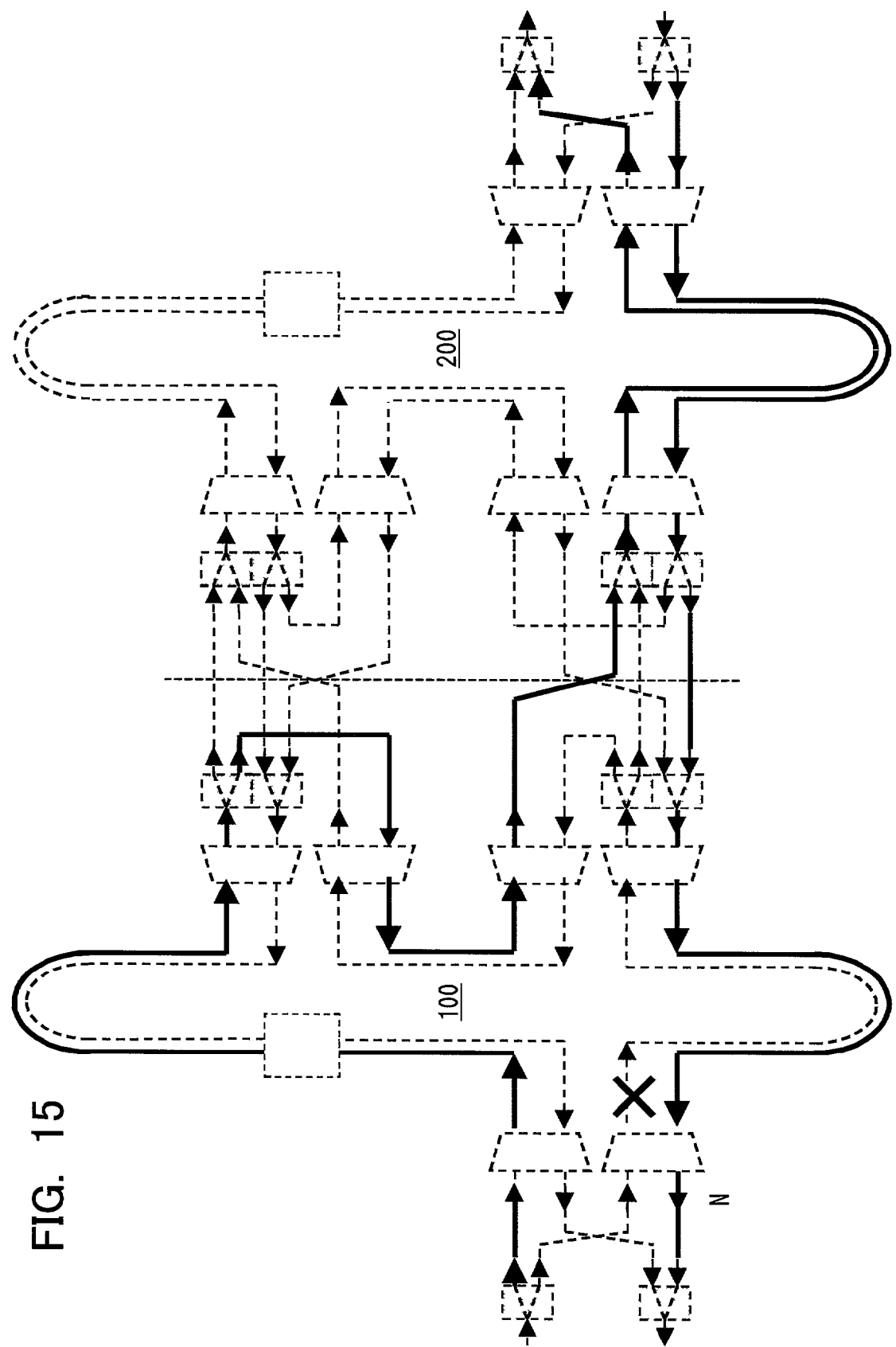
FIG. 15 shows a protection path in the case of a fault at the location X of a single transmission line fiber (on the WEST side).

In FIG. 15, there is shown a protection path in case that a fault occurs at the location marked with X of the single way transmission line fiber (WEST side). In nodes N20 and N80, each optical path cross-connect switch SW in a protection unit is switched over.

Further, each optical path cross-connect switch SW provided in protection units of network nodes N30, N40 and N60 is set effective. Accordingly, communication between N20 and N80 is maintained through the diverted transmission line fibers, as shown with bold lines, excluding the faulty single-way transmission line fiber in ring networks 100 and 200.

Figure 16:
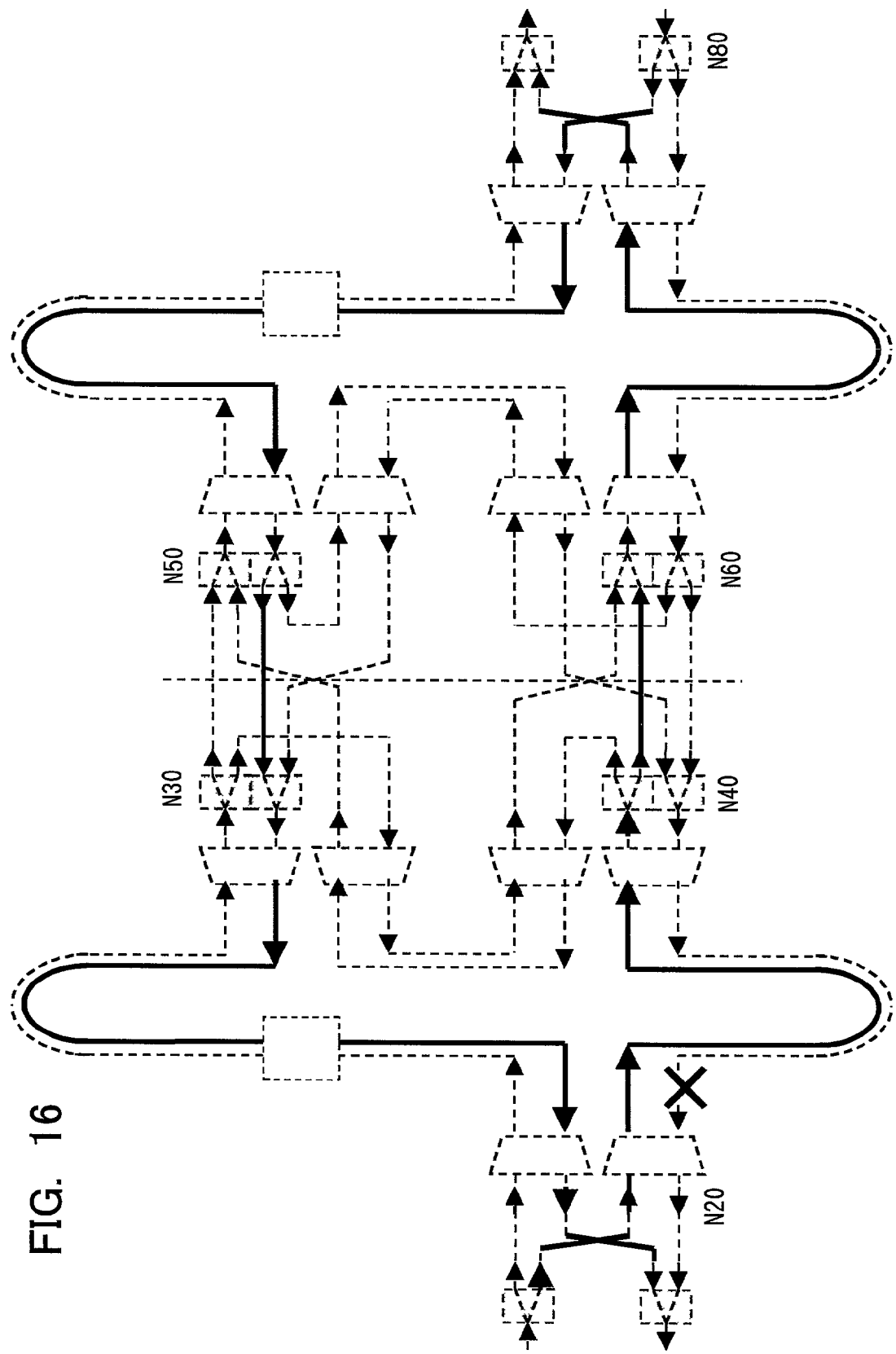
FIG. 16 shows a protection path in the case of a fault at the location X of a single transmission line fiber (on the EAST side).

In FIG. 16, there is shown a protection path in case that a fault occurs at the location marked with X of the single way transmission line fiber (EAST side). In nodes N20 and N80, each optical path cross-connect switch SW in a protection unit is switched over.

Further, each optical path cross-connect switch SW provided in the protection units of network nodes N30, N40, N50 and N60 is set effective. Accordingly, communication between N20 and N80 is maintained through the diverted transmission line fibers, as shown with bold lines, excluding the faulty single-way transmission line fiber in ring networks 100 and 200.

Figure 17:
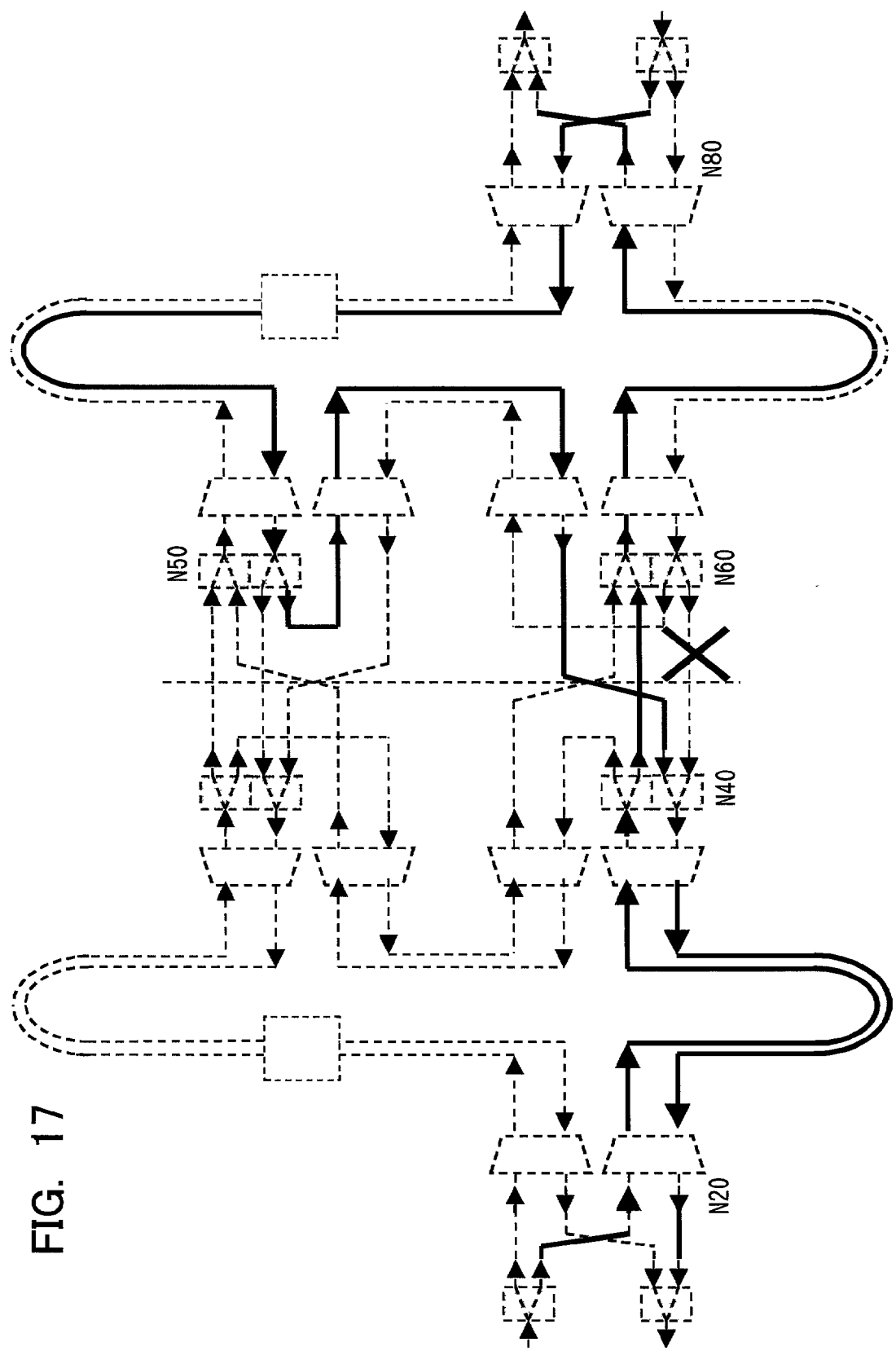
FIG. 17 shows a protection path in the case of a fault occurring at the location X between the internetwork connection nodes on a transmission line fiber directed to node N20.

In FIG. 17, there is shown a protection path in case that a fault occurs at the location marked with X of the transmission line fiber directed to node N20 between the internetwork connection nodes. In nodes N20 and N80, each optical path cross-connect switch SW in a protection unit is switched over.

Further, each optical path cross-connect switch SW in the protection units of network nodes N40, N50 and N60 is set effective. Accordingly, communication between N20 and N80 is maintained through the diverted transmission line fibers, as shown with bold lines, excluding the faulty single-way transmission line fiber in ring networks 100 and 200.

Figure 18:
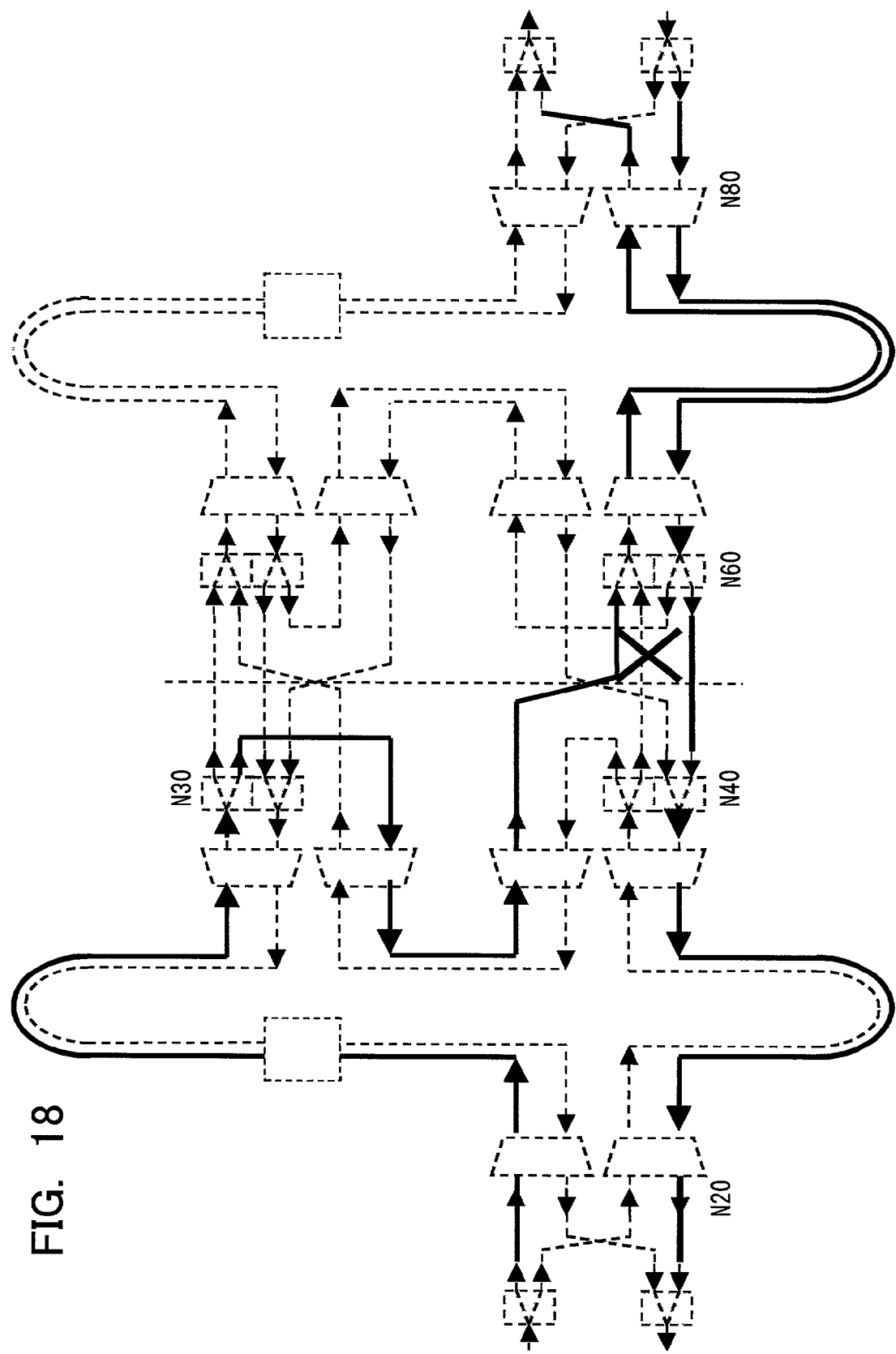
FIG. 18 shows a protection path in the case of a fault occurring at the location X between the internetwork connection nodes on a transmission line fiber directed to node N80.

In FIG. 18, there is shown a protection path in case that a fault occurs at the location marked with X of the transmission line fiber directed to node N80 between the internetwork connection nodes. In nodes N20 and N80, each optical path cross-connect switch SW in a protection unit is switched over.

Further, each optical path cross-connect switch SW in the protection units of network nodes N30, N40 and N60 is set effective. Accordingly, communication between N20 and N80 is maintained through the diverted transmission line fibers, as shown with bold lines, excluding the faulty single-way transmission line fiber in ring networks 100 and 200.

Figure 19:
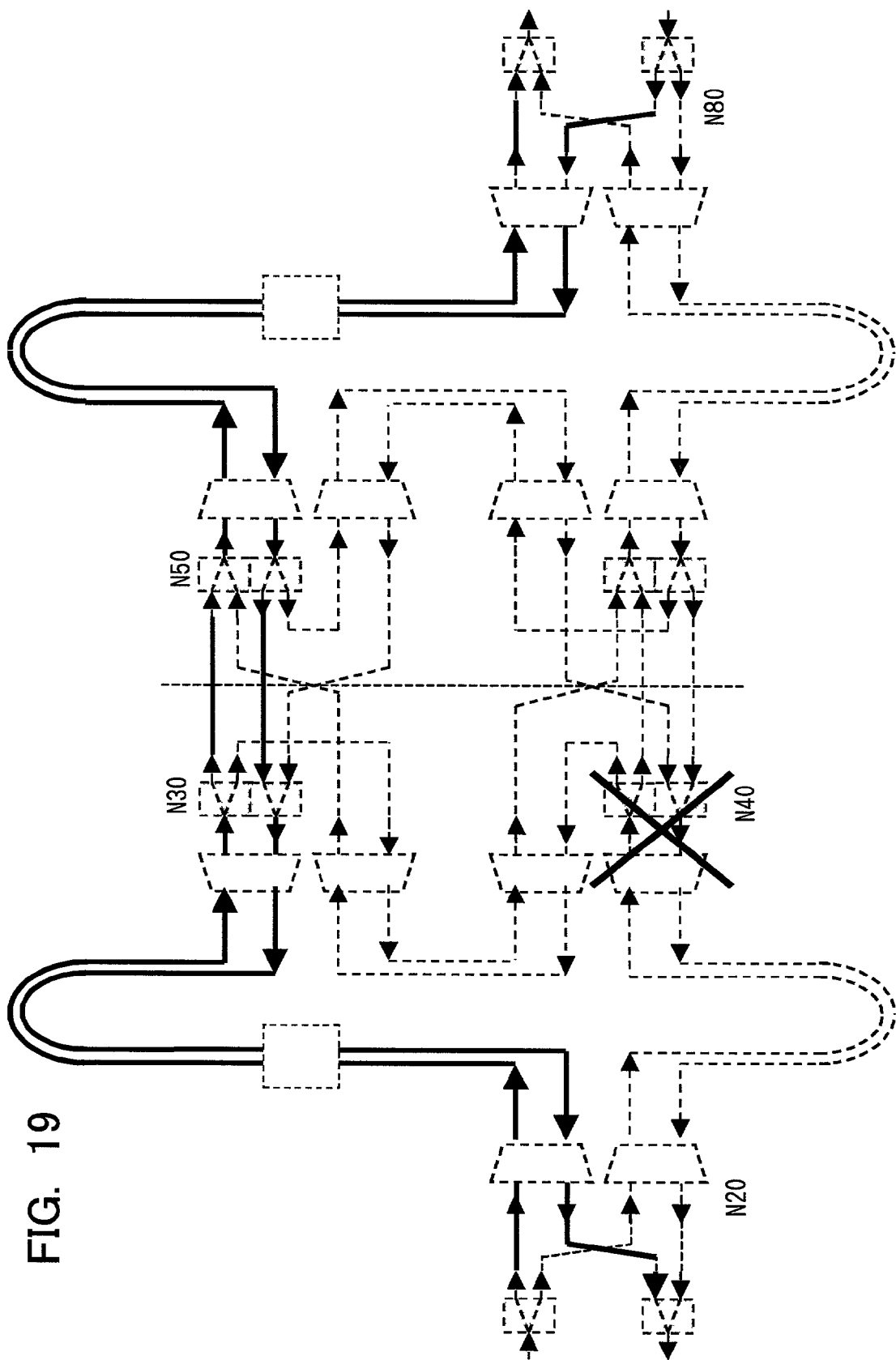
FIG. 19 shows a protection path in the case of a fault occurring in one of the duplicated optical path cross-connect switch of a protection unit provided in the internetwork connection nodes N40.

In FIG. 19, there is shown a protection path in case that one optical path cross-connect switch out of the duplicated cross-connect switches in internetwork connection node N40 is in a fault condition. In nodes N20 and N80, each optical path cross-connect switch SW in a protection unit is switched over.

Further, each optical path cross-connect switch SW in the protection units of internetwork connection nodes N30 and N50 is set effective. Accordingly, communication between N20 and N80 is maintained through the diverted transmission line fibers, as shown with bold lines, in ring networks 100 and 200. In this case, the route of the protection path is identical to the case of fault shown in FIG. 14.

Figure 20:
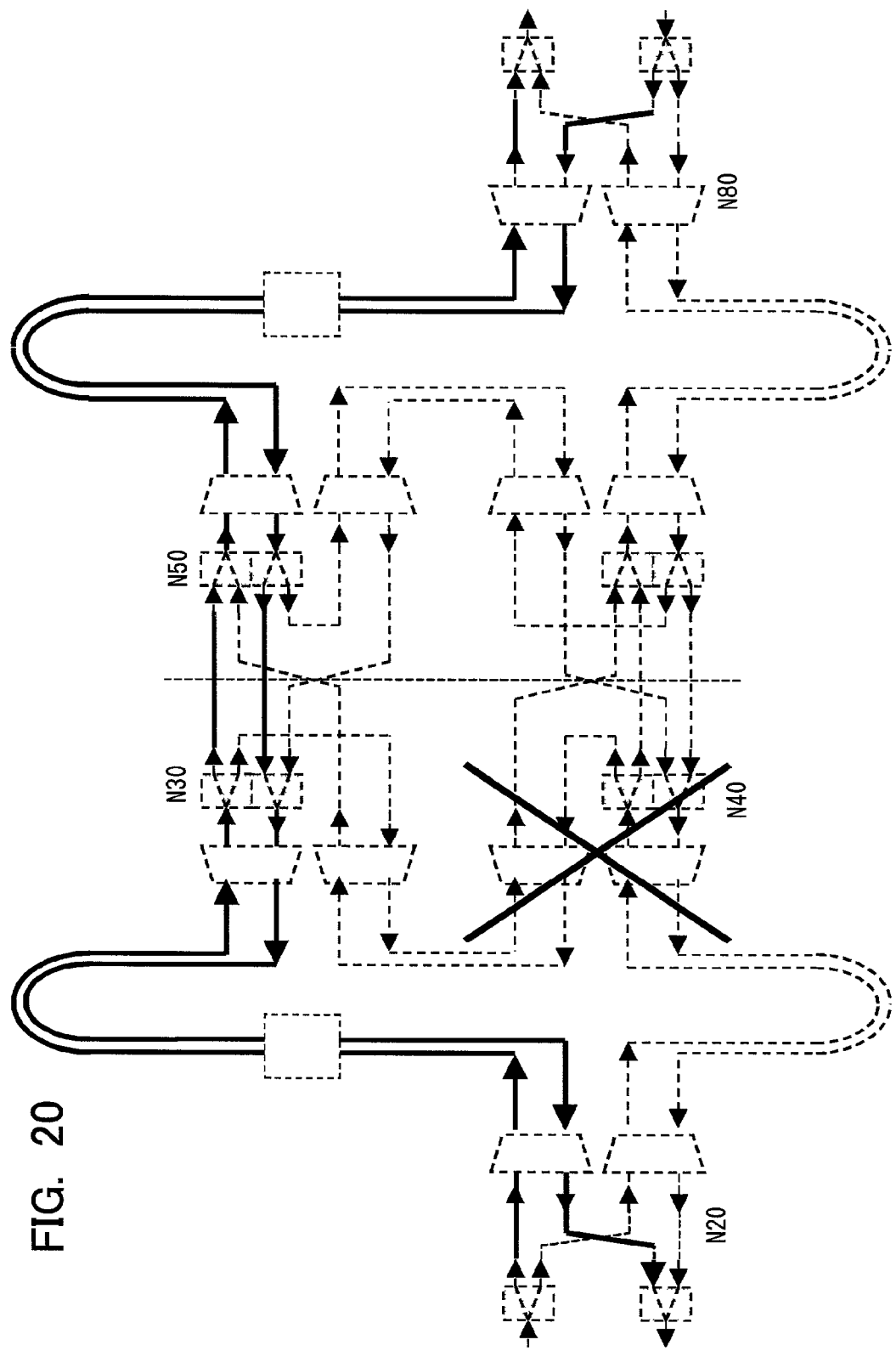
FIG. 20 shows a protection path in the case of a fault occurring in both the duplicated optical path cross-connect switches of the protection unit provided in the internetwork connection nodes N40.

In FIG. 20, there is shown a protection path in case that both duplicated optical path cross-connect switches in internetwork connection node N40 are in a fault condition. In nodes N20 and N80, each optical path cross-connect switch SW in a protection unit is switched over.

Further, each optical path cross-connect switch SW in the protection units of internetwork connection nodes N30 and N50 is set effective. Accordingly, communication between N20 and N80 is maintained through the diverted transmission line fibers, as shown with bold lines, in ring networks 100 and 200. Also in this case, the route of the protection path is identical to the case of fault shown in FIGS. 14 and 19.

Figure 21:
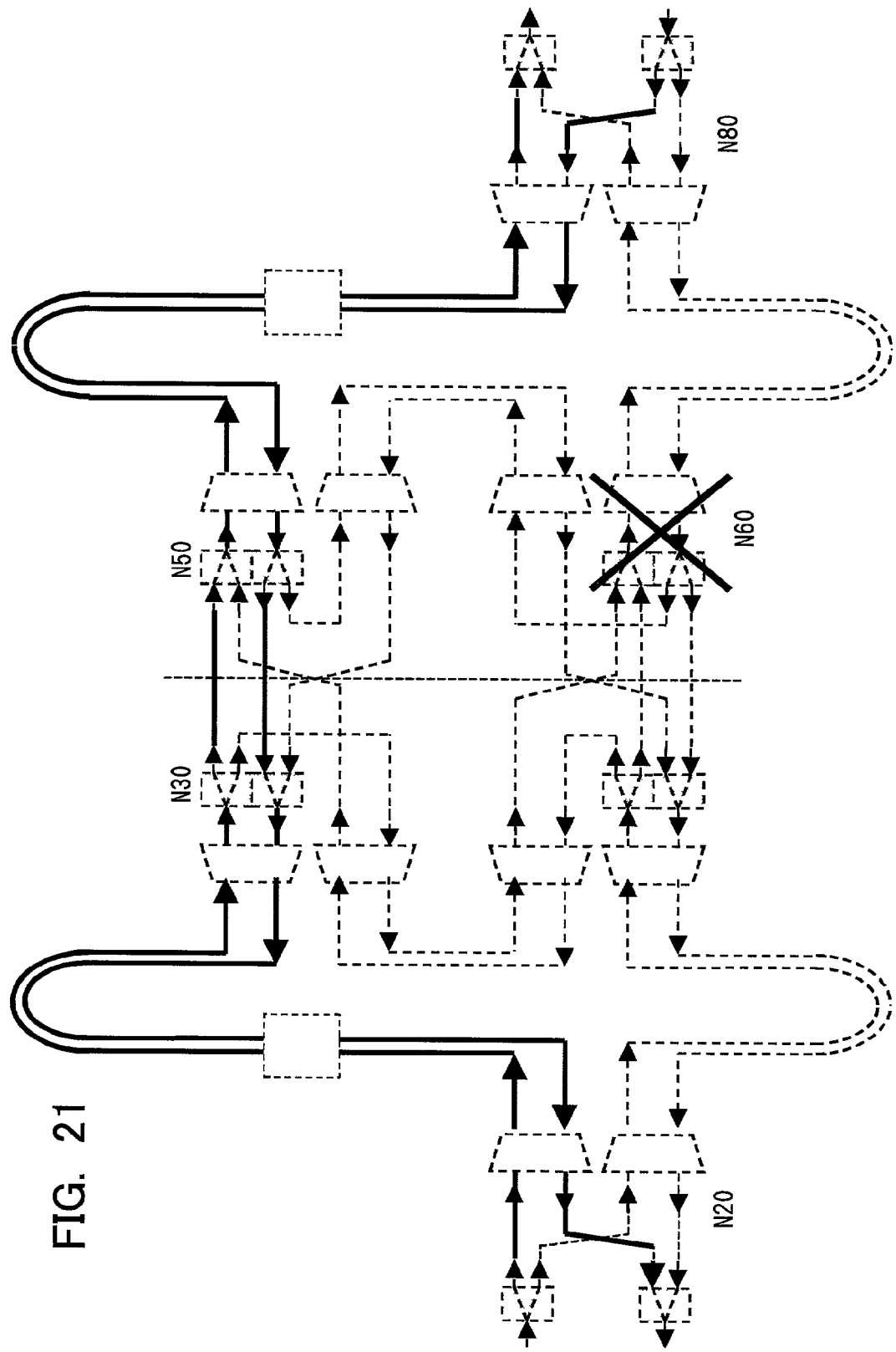
FIG. 21 shows a protection path in the case of a fault occurring in one of the duplicated optical path cross-connect switch of a protection unit provided in the internetwork connection nodes N60.

In FIG. 21, there is shown a protection path in case that one optical path cross-connect switch out of the duplicated cross-connect switches in internetwork connection node N60 is in a fault condition. In nodes N20 and N80, each optical path cross-connect switch SW in a protection unit is switched over.

Further, each optical path cross-connect switch SW in the protection units of internetwork connection nodes N30 and N50 is set effective. Accordingly, communication between N20 and N80 is maintained through the diverted transmission line fibers, as shown with bold lines, in ring networks 100 and 200. Also in this case, the route of the protection path is identical to the case of fault shown in FIG. 19.

Figure 22:
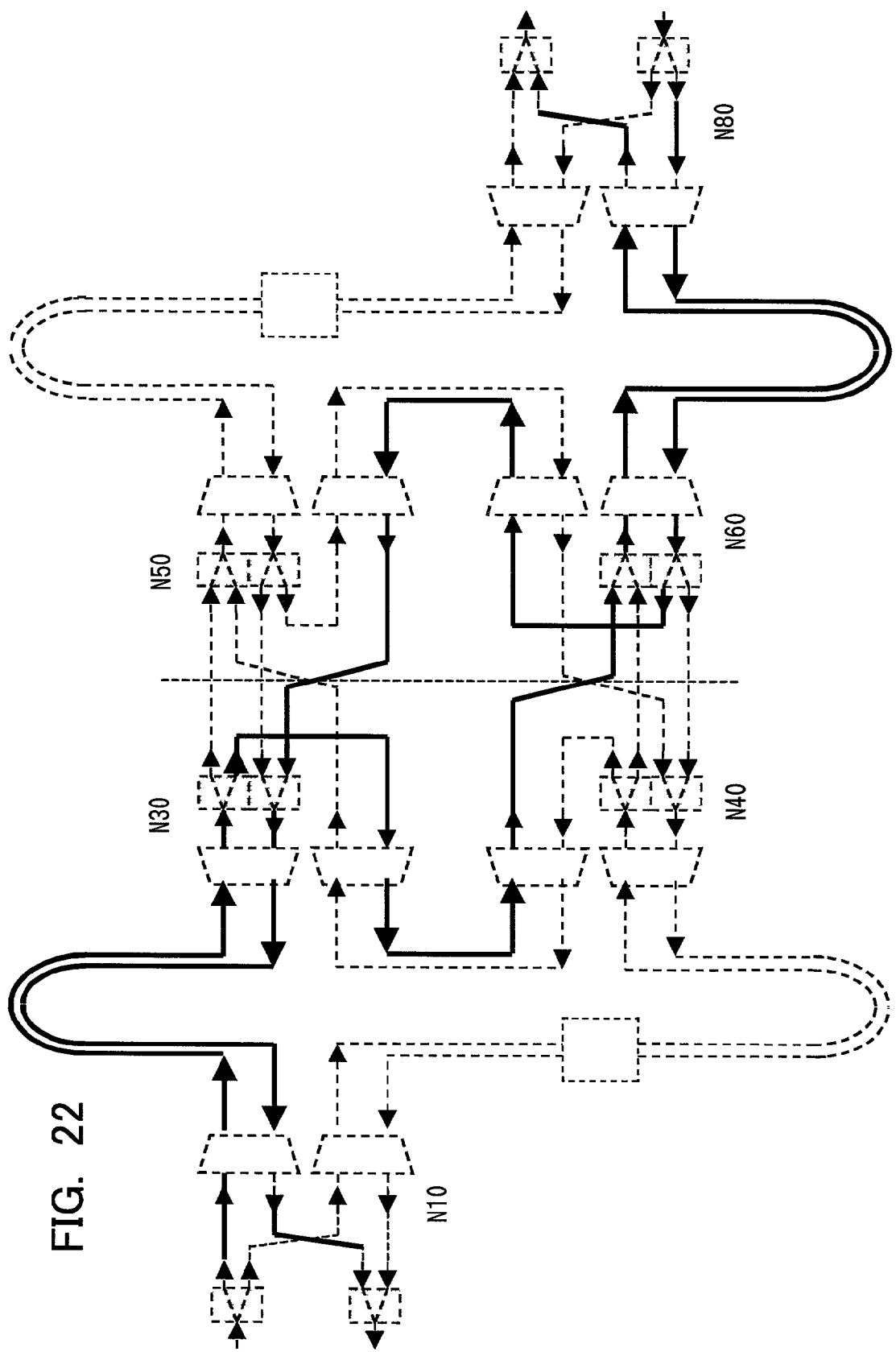
FIG. 22 shows a normal network topology when communication is carried out between nodes N10 and N80.

Now, the topology in the normal condition for communicating between nodes N20 and N80 is assumed as shown in FIG. 22.

Figure 23:
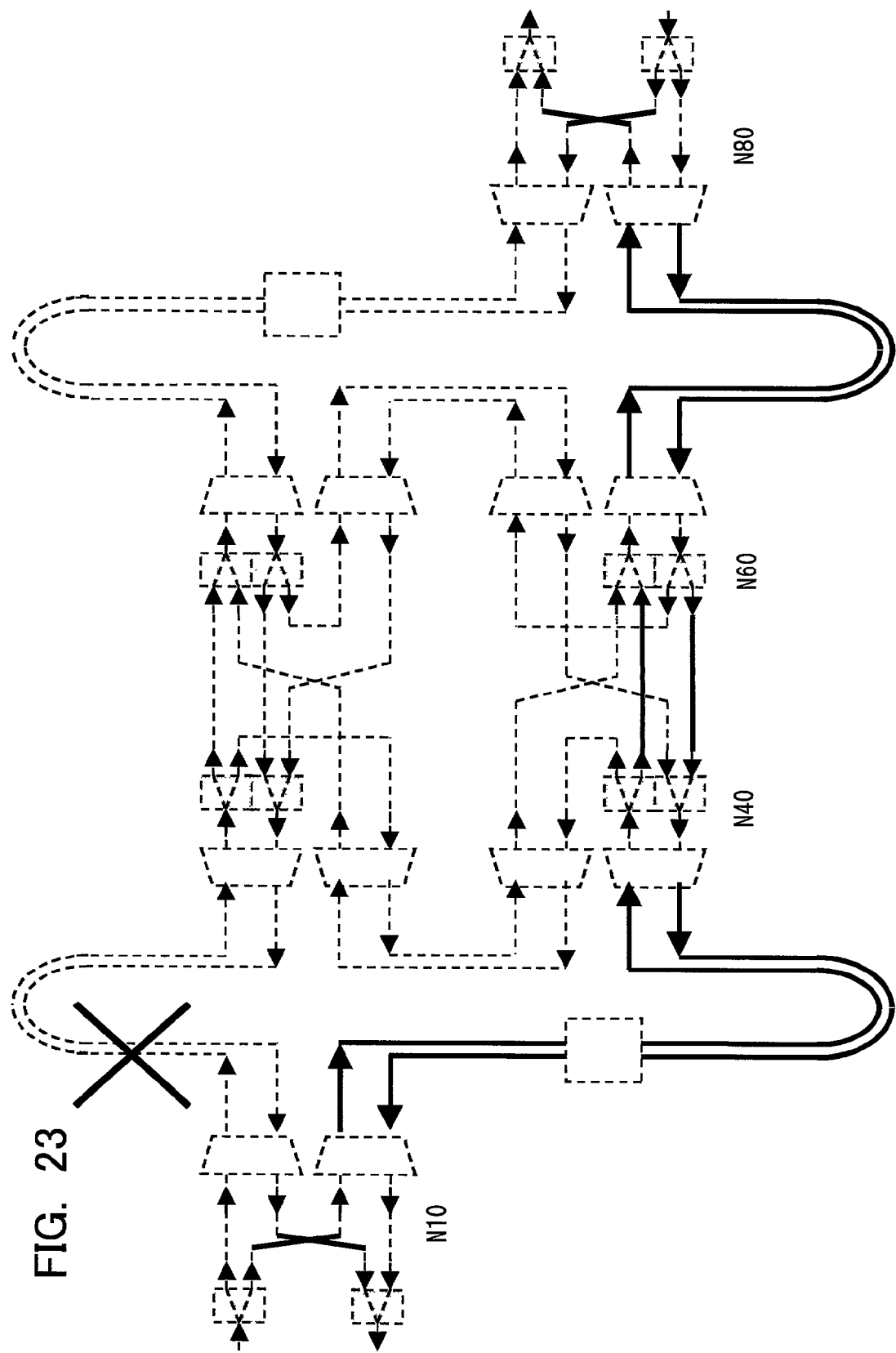
FIG. 23 shows a protection path in the case of a fault occurring on both-way transmission line fibers at the location X.

In FIG. 23, there is shown a protection path in case that a fault occurs at the location marked with X of the both-way transmission line fibers. In nodes N10 and N80, each optical path cross-connect switch SW in a protection unit is switched over. Further, each optical path cross-connect switch SW in the protection units of internetwork connection nodes N40 and N60 is set effective. Accordingly, communication between N10 and N80 is maintained through the diverted transmission line fibers, as shown with bold lines, in ring networks 100 and 200.

Figure 24:
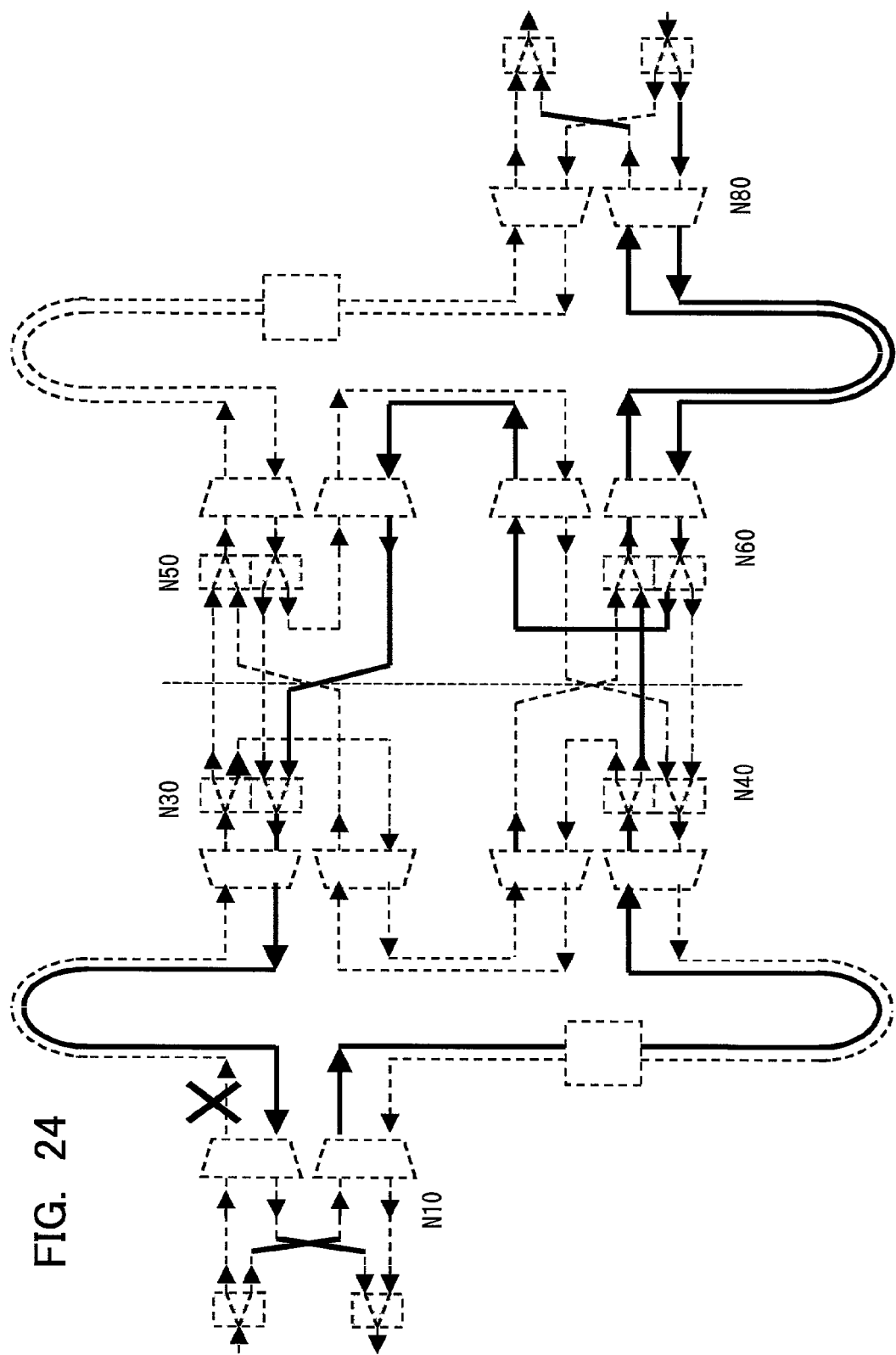
FIG. 24 shows a protection path in the case of a fault at the location X of a single transmission line fiber (on the WEST side).

In FIG. 24, there is shown a protection path in case that a fault occurs at the location marked with X of the single way transmission line fiber (WEST side). In nodes N10 and N80, each optical path cross-connect switch SW in a protection unit is switched over.

Further, each optical path cross-connect switch SW in the protection units of network nodes N30, N40, N50 and N60 is set effective. Accordingly, communication between N20 and N80 is maintained through the diverted transmission line fibers, as shown with bold lines, excluding the faulty single-way transmission line fiber in ring networks 100 and 200.

Figure 25:
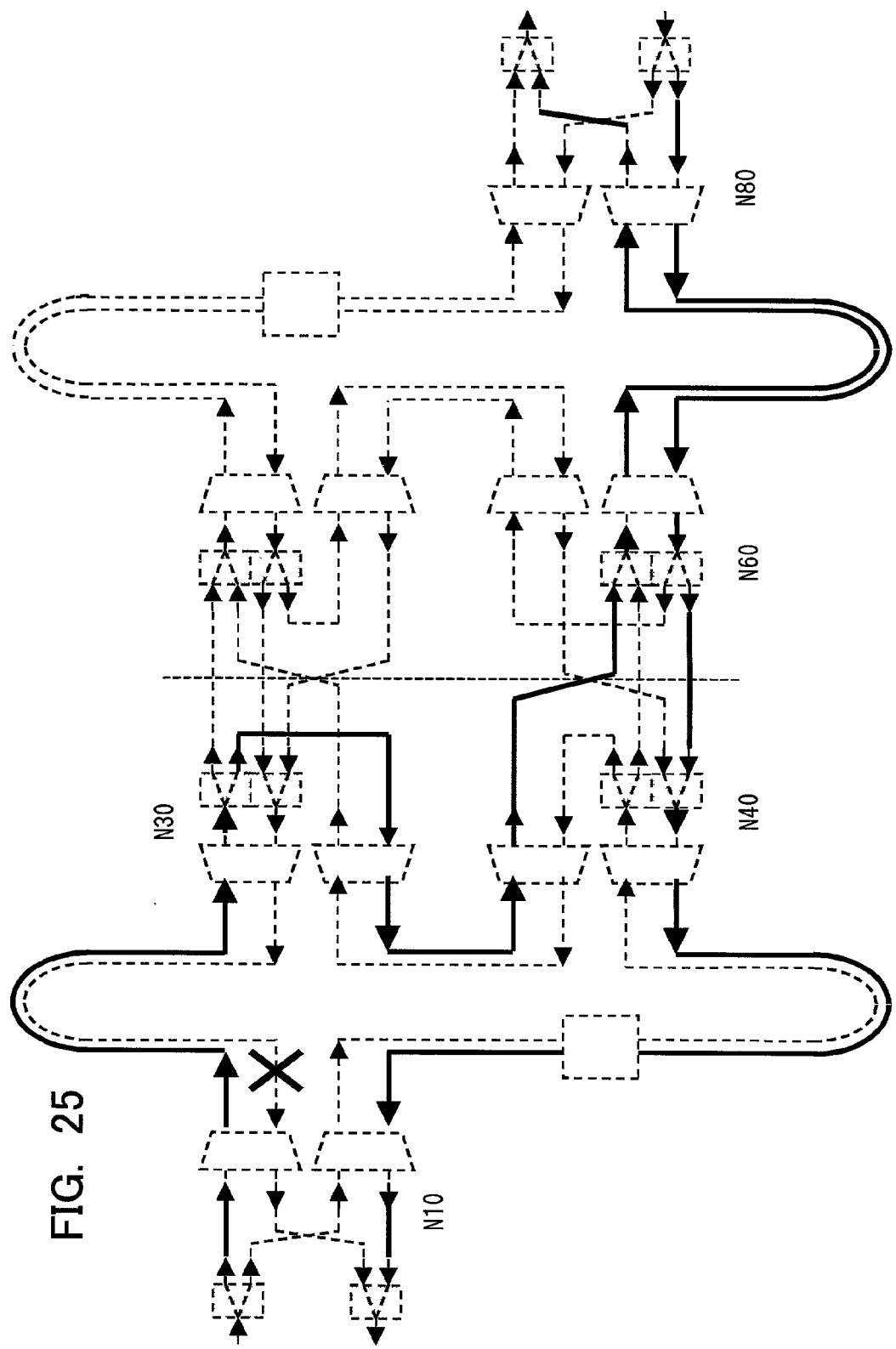
FIG. 25 shows a protection path in the case of a fault at the location X of a single transmission line fiber (on the EAST side).

In FIG. 25, there is shown a protection path in case that a fault occurs at the location marked with X of the single way transmission line fiber (EAST side). In nodes N10 and N80, each optical path cross-connect switch SW in a protection unit is switched over.

Further, each optical path cross-connect switch SW in the protection units of network nodes N30, N40 and N60 is set effective. Accordingly, communication between N10 and N80 is maintained through the diverted transmission line fibers, as shown with bold lines, excluding the faulty single-way transmission line fiber in ring networks 100 and 200.

Figure 26:
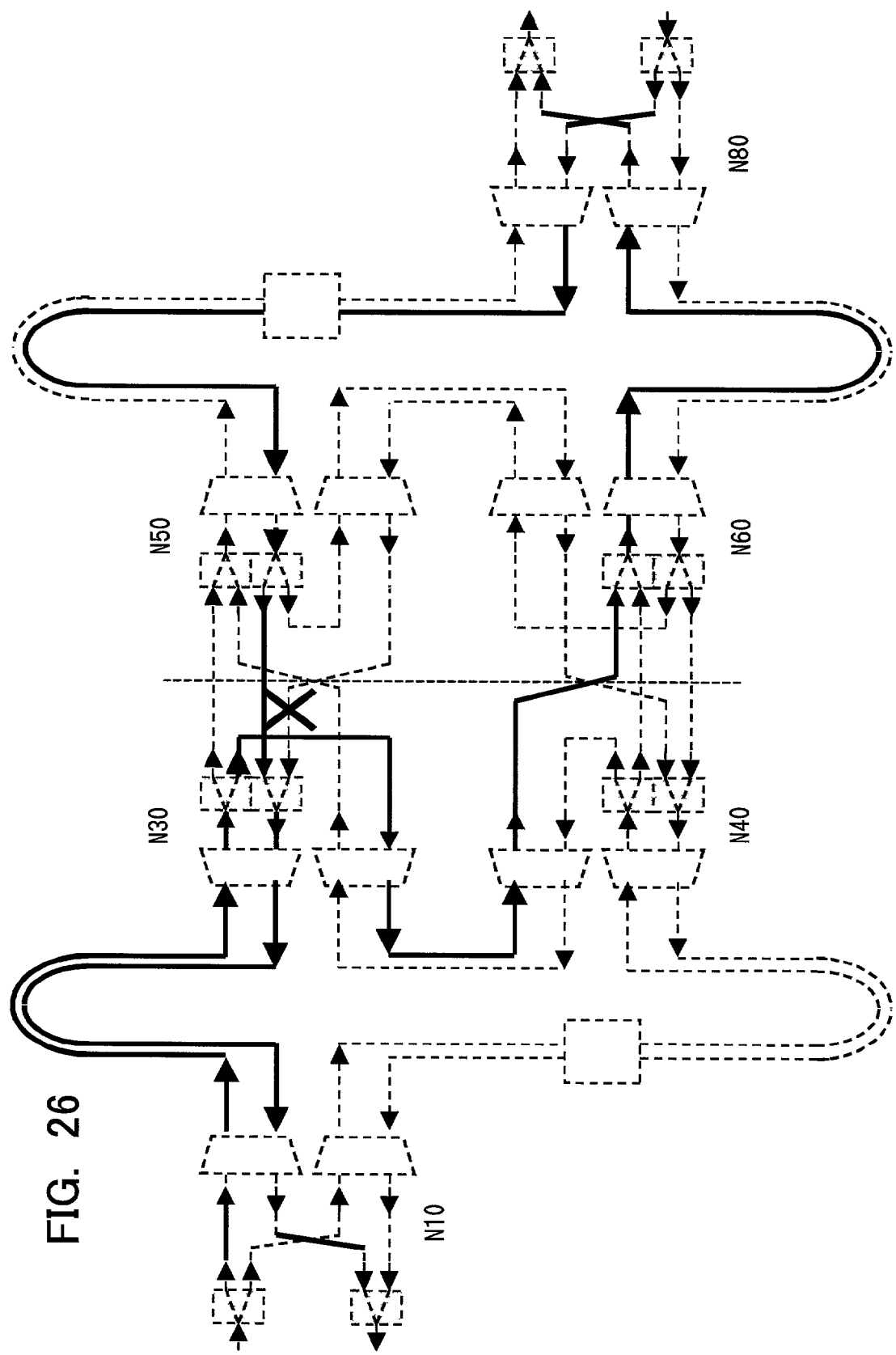
FIG. 26 shows a protection path in the case of a fault occurring at the location X between the internetwork connection nodes N30 and N50 on a transmission line fiber directed toward node N10.

In FIG. 26, there is shown a protection path in case that a fault occurs at the location marked with X of the transmission line fiber directed to node N10 between the internetwork connection nodes N30 and N50. In nodes N10 and N80, each optical path cross-connect switch SW in a protection unit is switched over.

Further, each optical path cross-connect switch SW in the protection units of network nodes N30, N40, N50 and N60 is set effective. Accordingly, communication between N10 and N80 is maintained through the diverted transmission line fibers, as shown with bold lines, excluding the faulty single-way transmission line fiber in ring networks 100 and 200.

Figure 27:
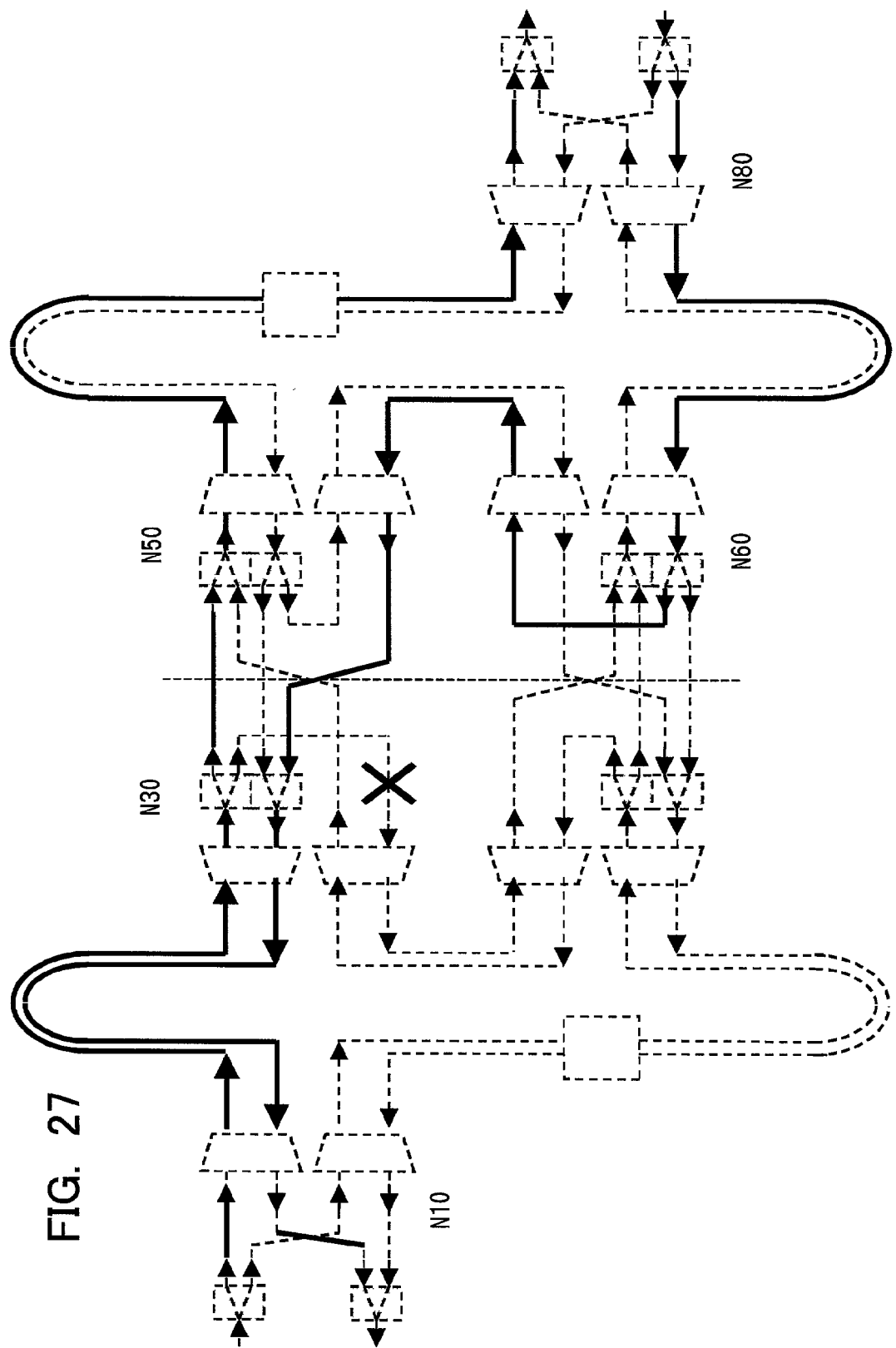
FIG. 27 shows a protection path in the case of a fault occurring at the location X between the internetwork connection nodes N30 and N50 on a transmission line fiber directed toward node N80.

In FIG. 27, there is shown a protection path in case that a fault occurs at the location marked with X of the transmission line fiber directed to node N80 between the internetwork connection nodes N30 and N50. In nodes N20 and N80, each optical path cross-connect switch SW in a protection unit is switched over.

Further, each optical path cross-connect switch SW in the protection units of network nodes N30, N50 and N60 is set effective. Accordingly, communication between N10 and N80 is maintained through the diverted transmission line fibers, as shown with bold lines, excluding the faulty single-way transmission line fiber in ring networks 100 and 200.

Figure 28:
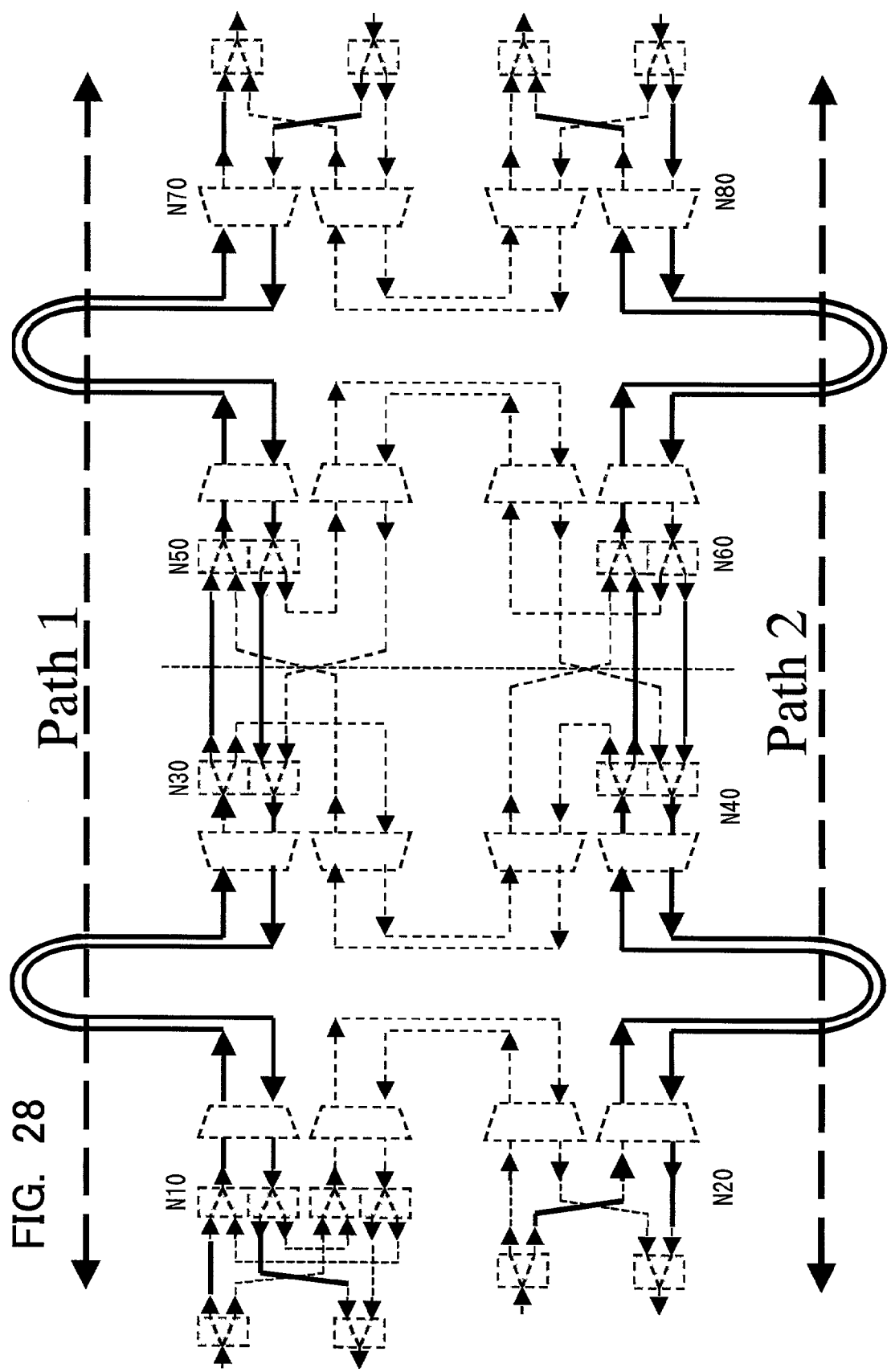
FIG. 28 shows an implementation configuration of a WDM ring network (WDM diversity ring network).

In FIG. 28, there is shown a configuration of a WDM ring network (WDM diversity ring network having optical protection units provided with optical cross-connect switches SW. It is assumed in this network that an add, drop and continue node N10 exists in one of the ring. Here, path 1 transmits through nodes N10, N30, N50 and M70, while path 2 transmits through nodes N20, N40, N60 and N80.

Now, as shown in FIG. 29, when a fault occurs on both ways of the transmission line at the location X on path 2, a diverted path functions through nodes N10, N30 and N50 taking priority over path 1, thus communication is relieved using path 2 through nodes N20 and N80, as shown with the bold line in FIG. 29.

Figure 12:
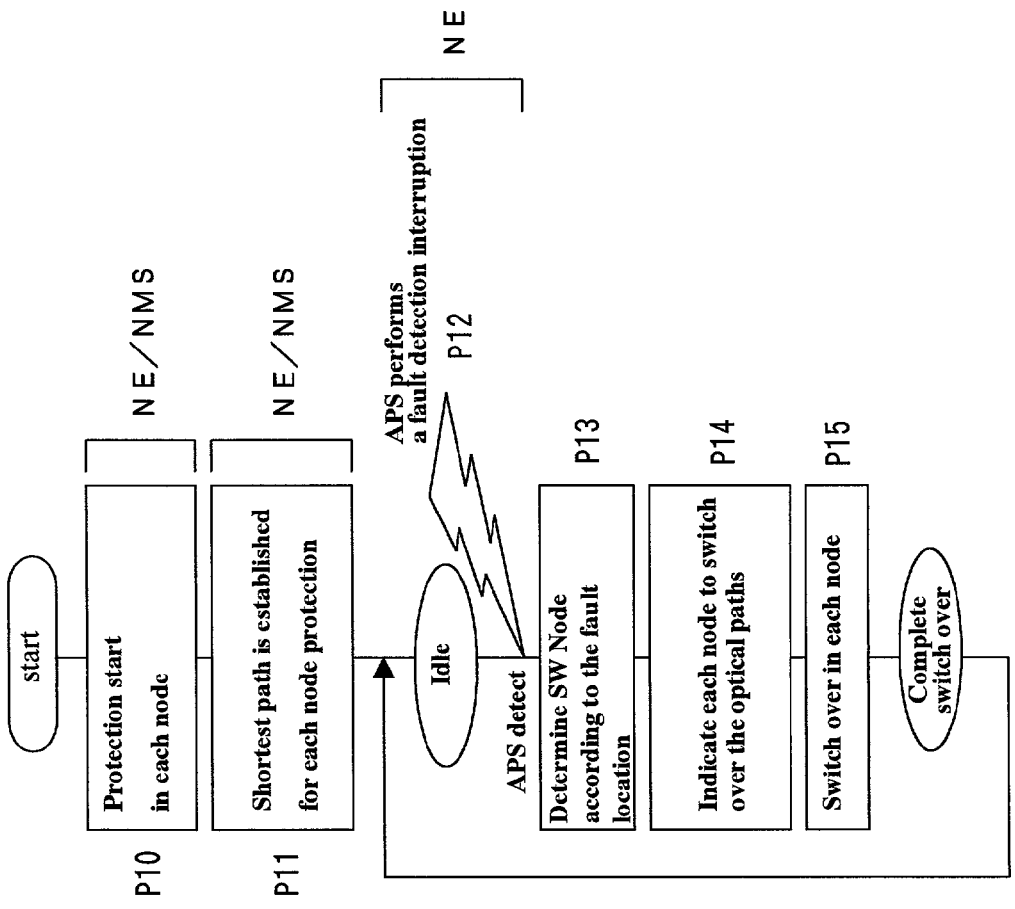
FIG. 12 shows a process of the optical path switch over operation for protection in the event of a fault, according to a connection pattern stored in database 10-1.

Referring back to FIG. 11, various connection patterns are shown in FIGS. 13 to 29 are stored in data base 10-1 corresponding to fault locations. In FIG. 12, there is shown a chart illustrating an optical path switch over operation for protection in case a fault occurs during a connection pattern stored in the aforementioned database 10-1.

In FIG. 12, a protection procedure is started in each node (procedure P10). A shortest path connecting between each terminal station for message communication is established by a network management system 10 (procedure P11).

Then, an automatic protection system (APS) performs a fault detection interruption in network management system 10 (procedure P12). On detection of the fault, nodes in which optical path switchovers have to performed are determined according to the fault location, based on the connection patterns shown in FIGS. 13 to 29 using database 10-1 (procedure P13).

After the nodes to perform optical path switch over is determined, network management system 10 indicates each corresponding node to switch over the optical paths (procedure P14). Then, the nodes receiving the indication controls optical path cross-connect switches SW to protect against the fault (procedure P15).

As the embodiment having been described, the present invention enables to perform proper switch over for optical path protection against a fault in a WDM system having interconnected ring networks, using currently available equipment.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical wavelength multiplexing diversity communication system comprising:
    a plurality of optical wavelength multiplexing networks each having a plurality of nodes; and
    a network management system for monitoring conditions of the plurality of nodes; wherein
    the plurality of nodes include
        a first node having functions of adding and dropping optical wavelength-multiplexed signals to/from the network,
        a second node having a signal transferring function as well as the adding and dropping functions, and
        a third node having an internetworking function for interconnecting the networks, and
        the first, second and third nodes respectively include optical path cross-connect switches, and
    the network management system further includes a table for indicating status of the optical path cross-connect switches and a node fault detection condition of the first, second and third nodes,
    the network management system is common to each of the first, second and third nodes, and
    the network management system controls to set the optical path cross-connect switches according to the fault detection condition of the first, second and third nodes indicated in the table so that an optimal optical path may be obtained, and
    the network management system retains, in advance, shortest path information related to interconnection of the plurality of nodes, determines the optimal optical path based on the node fault detection conditions, and controls to set the optical path cross-connect switches in the first, second and third nodes to obtain the optimal optical path.

2. The optical wavelength multiplexing diversity communication system according to claim 1,
    wherein the optical wavelength multiplexing networks include a first ring network and a second ring network, and at least two pairs of nodes functioning as the third nodes are provided for interconnecting the first ring network and the second ring network.

3. The optical wavelength multiplexing diversity communication system according to claim 2,
    wherein optical transmission lines for interconnecting nodes in the first and second ring networks are constituted by a pair of optical transmission lines to transmit optical signals in mutually opposite directions, and at least two pairs of nodes for interconnecting the first ring network and the second ring network are respectively connected with a pair of optical transmission lines to transmit optical signals in mutually opposite directions.

4. A communication system comprising:
    first, second and third nodes of an optical wavelength multiplexing network, the first node including an adding function of adding optical wavelength-multiplexed signals to the network, a dropping function of dropping optical wavelength-multiplexed signals from the network, the second node including the adding function, the dropping function and a signal transferring function, and the third node including an internetworking function; and
    a network management system which is common to the first, second and third nodes and includes a table for indicating status of optical path cross-connect switches in the first, second and third nodes and a node fault detection condition of the first, second and third nodes, the network management system retaining in advance shortest path information related to interconnection of the first, second and third nodes, using the retained information and the status of the optical path cross-connect switches indicated in the table to determine an optimal path based on node fault detection conditions indicated in the table and the functions of the first, second and third nodes, and setting the optical path cross-connect switches in the first, second and third nodes to obtain the determined optimal path.

5. A communication system as in claim 4, wherein the network includes first and second ring networks, and at least two pairs of nodes functioning as the third nodes are provided for interconnecting the first and second ring networks.

6. An apparatus comprising:
    a network management system retaining in advance shortest path information related to interconnection of first, second and third nodes of an optical wavelength multiplexing network, and including a table for indicating status of optical path cross-connect switches in the first, second and third nodes and a node fault detection condition of the first, second and third nodes,
    the network management system using the retained information and the status of the optical cross-connect switches indicated in the table to determine an optimal path based on node fault detection conditions indicated in the table and functions of the first, second and third nodes, and setting the optical path cross-connect switches in the first, second and third nodes to obtain the determined optimal path, wherein
        the first node includes an adding function of adding optical wavelength-multiplexed signals to the network and a dropping function of dropping optical wavelength-multiplexed signals from the network, the second node includes the adding function, the dropping function and a signal transferring function, and the third node includes an internetworking function, and
        the network management system is common to the first, second and third nodes.

7. An apparatus as in claim 6, wherein the network includes first and second ring networks, and at least two pairs of nodes functioning as the third nodes are provided for interconnecting the first and second ring networks.

8. A communication system comprising:
    first, second and third nodes of an optical wavelength multiplexing network, the first node including an adding function of adding optical wavelength-multiplexed signals to the network and a dropping function of dropping optical wavelength-multiplexed signals from the network, the second node including the adding function, the dropping function and a signal transferring function, and the third node including an internetworking function; and means for retaining in advance shortest path information related to interconnection of the first, second and third nodes, for maintaining a table for indicating status of optical path cross-connect switches in the first, second and third nodes and a node fault detection conditions of the first, second and third nodes, for using the retained information and the status of the optical cross-connect switches indicated in the table to determine an optimal path based on node fault detection conditions and the functions of the first, second and third nodes, and for setting optical path cross-connect switches in the first, second and third nodes to obtain the determined optimal path, said means being common to the first, second and third nodes.

9. A communication system as in claim 8, wherein the network includes first and second ring networks, and at least two pairs of nodes functioning as the third nodes are provided for interconnecting the first and second ring networks.

10. A communication system comprising:

first and second ring networks;

a first type of node, included in one of the first and second ring networks, having an adding function of adding optical wavelength-multiplexed signals to said one of the first and second ring networks, and a dropping function of dropping optical wavelength-multiplexed signals from said one of the first and second ring networks;

a second type of node, included in one of the first and second ring networks, having the adding function of adding optical wavelength-multiplexed signals to said one of the first and second ring networks, the dropping function of dropping optical wavelength-multiplexed signals from said one of the first and second ring networks, and a signal transferring function;

at least two of a third type of node having an internetworking function, included in the first ring network;

at least two of the third type of node having the internetworking function, included in the second node, wherein said at least two of the third type of node included in the first ring network and said at least two of the third type of node included in the second ring network operate together to interconnect the first and second ring networks; and means for retaining in advance shortest path information related to interconnection of the first type of node, the second type of node, said at least two of the third type of node included in the first ring network and said at least two of the third type of node included in the second ring network, for maintaining a table for indicating status of optical path cross-connect switches in the first type of node, in the second type of node, in said at least two of the third type of node including in the first ring network and in said at least two of the third type of node included in the second ring network and a node fault detection condition of the first type of node, of the second type of node, of said at least two of the third type of node included in the first ring network and of said at least two of the third type of node included in the second ring network, for using the retained information and the status of the optical cross-connect switches indicated in the table to determine an optimal path based on node fault detection conditions indicated in the table and the functions of the first type of node, the second type of node, said at least two of the third type of node included in the first ring network and said at least two of the third type of node included in the second ring network, and for setting the optical path cross-connect switches in the first type of node, the second type of node, said at least two of the third type of node included in the first ring network and said at least two of the third type of node included in the second ring network to obtain the determined optimal path, said means being common to the first type of node, the second type of node, said at least two of the third type of node included in the first ring network and said at least two of the third type of node included in the second ring network.

* * * * *

UNITED STATES PATENT AND TRADEMARK OFFICE
CERTIFICATE OF CORRECTION

| | | |
|---|---|---|
| PATENT NO. | : 7,242,861 B2 | Page 1 of 1 |
| APPLICATION NO. | : 09/907657 | |
| DATED | : July 10, 2007 | |
| INVENTOR(S) | : Kazuyuki Sato | |

It is certified that error appears in the above-identified patent and that said Letters Patent is hereby corrected as shown below:

Column 13, Line 12, change "conditions" to --condition--.

Column 13, Line 13, change "nodes,for" to --nodes, for--.

Column 13, Line 16, after "conditions" insert --indicated in the table--.

Column 14, Line 16, change "including" to --included--.

Signed and Sealed this

Thirteenth Day of November, 2007

JON W. DUDAS
*Director of the United States Patent and Trademark Office*